United States Patent
Cai et al.

(10) Patent No.: US 11,178,881 B2
(45) Date of Patent: Nov. 23, 2021

(54) FROZEN DOUGH PRODUCT AND METHOD FOR MAKING THE SAME

(71) Applicant: SFC Global Supply Chain, Inc., Marshall, MN (US)

(72) Inventors: Rongxuan Cai, Marshall, MN (US); Stacey Fowler Meittunen, Edina, MN (US)

(73) Assignee: SFC Global Supply Chain, Inc., Marshall, MN (US)

( * ) Notice: Subject to any disclaimer, the term of this patent is extended or adjusted under 35 U.S.C. 154(b) by 369 days.

(21) Appl. No.: 15/352,183

(22) Filed: Nov. 15, 2016

(65) Prior Publication Data

US 2017/0142982 A1    May 25, 2017

Related U.S. Application Data

(60) Provisional application No. 62/257,516, filed on Nov. 19, 2015.

(51) Int. Cl.

| | |
|---|---|
| *A21D 13/00* | (2017.01) |
| *A21D 15/02* | (2006.01) |
| *A21D 10/02* | (2006.01) |
| *A21D 8/02* | (2006.01) |
| *A21D 13/22* | (2017.01) |
| *A21D 8/04* | (2006.01) |

(52) U.S. Cl.
CPC ............. *A21D 15/02* (2013.01); *A21D 8/025* (2013.01); *A21D 8/047* (2013.01); *A21D 10/025* (2013.01); *A21D 13/00* (2013.01); *A21D 13/22* (2017.01)

(58) Field of Classification Search
CPC .............................. A21D 15/02; A21D 13/00
USPC ........................................................... 426/19
See application file for complete search history.

(56) References Cited

U.S. PATENT DOCUMENTS

| | | | |
|---|---|---|---|
| 2,523,483 A | 3/1947 | Stern | |
| 3,894,155 A | 7/1975 | Ono et al. | |
| 4,414,228 A | 11/1983 | Nourigeon | |
| 4,450,177 A | 5/1984 | Larson et al. | |
| 4,719,114 A | 1/1988 | Percel | |
| 4,847,104 A | 7/1989 | Benjamin et al. | |
| 5,707,669 A | 1/1998 | Soltis et al. | |
| 6,261,613 B1 | 7/2001 | Narayanaswamy et al. | |
| 6,616,954 B1 | 9/2003 | Dally et al. | |
| 6,835,397 B2 * | 12/2004 | Lee | A21D 8/042 264/4.3 |
| 6,884,443 B2 | 4/2005 | Domingues et al. | |
| 7,175,865 B2 | 2/2007 | Lonergan | |
| 7,341,753 B2 | 3/2008 | Domingues et al. | |
| 7,371,421 B2 | 5/2008 | Domingues et al. | |
| 7,704,535 B2 | 4/2010 | Zhang et al. | |
| 2003/0104100 A1 * | 6/2003 | Goedeken | A21D 2/02 426/27 |
| 2003/0175382 A1 | 9/2003 | Dally et al. | |
| 2005/0136167 A1 | 6/2005 | Kraklow et al. | |
| 2008/0248168 A1 | 10/2008 | Black | |
| 2010/0086639 A1 | 4/2010 | Pai et al. | |
| 2010/0215801 A1 | 8/2010 | Pai | |
| 2010/0303956 A1 | 12/2010 | Hupfer | |
| 2011/0033574 A1 * | 2/2011 | Bonjean | A21D 8/047 426/19 |

FOREIGN PATENT DOCUMENTS

| | | |
|---|---|---|
| CA | 2693816 | 8/2010 |
| EP | 1693445 B1 | 1/2008 |
| WO | 2010068823 | 6/2010 |

OTHER PUBLICATIONS

JP-01-252241—English Abstract—pp. 5-6 (Year: 1989).*
"Bread and Roll Production: Straight Dough and Sponge Dough" by AIB (American Institute of Baking), 8 pages, 2007.
Kennedy, Managing Frozen Foods, Chapter 8.3.5 "Frozen Dough," Woodhead Publishing, pp. 146-149, copyright 2000.
Morimoto et al., "Restoration of breadmaking properties to frozen dough by addition of sugar and yeast and subsequent processing," Cereal Chemistry, 88(4):409-413, Jul./Aug. 2011.
Casey et al., "Yeast performance in frozen doughs and strategies for improvement," Frozen & Refrigerated Dough and Batters, American Association of Cereal Chemists, Inc., (AACCI), Chpt. 2, pp. 19-51, 1995.

* cited by examiner

*Primary Examiner* — Hamid R Badr
(74) *Attorney, Agent, or Firm* — Merchant & Gould P.C.

(57) ABSTRACT

A proofed frozen dough includes a dough mixture of flour, water, and optionally additives; gas bubbles dispersed throughout the dough matrix; a spent yeast component; and a preserved yeast component. According to some aspects, the preserved yeast component includes encapsulated yeast, fat-coated yeast, non-hydrated active dry yeast, non-hydrated instant yeast, non-hydrated semi-dry yeast, non-hydrated frozen yeast, or a combination thereof. A frozen dough product can be prepared by mixing dough ingredients to produce a dough composition, where the dough ingredients include water, flour, a first yeast, and a second yeast; proofing the dough, where during proofing the first yeast is spent and the second yeast is preserved; and freezing the dough after proofing.

41 Claims, 18 Drawing Sheets

FROZEN DOUGH PRODUCT AND METHOD FOR MAKING THE SAME

CROSS-REFERENCE TO RELATED APPLICATION

This application claims the benefit of U.S. Provisional Application Ser. No. 62/257,516, filed Nov. 19, 2015, which is incorporated by reference herein in its entirety.

FIELD

The present disclosure relates to frozen dough products and methods for making the same. In particular, the present disclosure relates to frozen dough products that have been proofed and that include a spent yeast portion and a preserved yeast portion.

BACKGROUND

The quality of yeast leavened bakery items, such as bread or pizza crust, can be largely attributed to the leavening action of yeast through various fermentation and proofing steps. The yeast metabolically consumes sugars in a dough and generates carbon dioxide to leaven the dough, creating a sponge-like texture and producing unique flavor and taste characteristics through fermentation. In contrast, a chemical leavening agent may produce gasses to leaven the dough, but may not impact flavor and taste characteristics. Some chemicals may impact flavor and taste, but do not act as leaveners.

The intensity of flavors and the volume of the bakery item can often be adjusted by controlling the fermentation and proofing conditions. However, while the desired quality of a par-baked or fully baked bakery product can usually be obtained without difficulty by modifying process conditions, obtaining similar results for frozen raw dough presents challenges. For example, when raw dough is frozen, the dough is subject to harsh conditions at subzero temperatures (usually at about −20° F., or about −29° C.). Freezing and thawing of the dough can lead to loss of volume and texture, particularly if dough is frozen after proofing.

Yeast in a dough becomes active during fermentation and proofing. Activation of yeast means that the yeast cells metabolically consume sugars and produce carbon dioxide. Yeast has an optimal metabolic temperature in the range of 90-110° F. (about 32 to about 43° C.) and pH in the range of pH 4-6. After proofing, the yeast in the dough is spent (i.e., has lost its vitality), and no significant amounts of active yeast are left.

In a typical baking process, a final fermentation step (i.e., a proofing) occurs just prior to baking. A proofed dough has lost its yeast vitality and is typically fragile in the sense that it has limited gas-holding ability. If instead of baking, the proofed dough is frozen, the structure of the dough will likely fail during frozen storage due to the limited gas-holding capacity. The loss of gas holding ability of a proofed frozen dough and the quality deterioration of the dough typically will result in a lower rising height or even a soggy dough layer after baking. The degree of quality loss is directly related to the property of dough matrix determined by formula and environmental conditions determined by storage temperature, degree of freeze-thaw abuse through temperature variation or physical abuse. The use of dough conditioners, such as flour oxidative agents, emulsifiers, gums and enzymes, as well as the employment of a stable freezing temperature can normally extend the shelf-life and freeze-thaw stability of the dough and enhance the rising height or volume of the product after baking. However, these measures can only slow down the speed of the deterioration and cannot repair the gas losses or completely prevent the quality losses. Because the yeast is spent, the dough is unable to recover the lost volume.

In addition to being largely spent, the yeast in a proofed dough will be further subject to ice damage, cold shock, and changes in osmotic pressure during freezing, which will likely kill any remaining live yeast. The freeze-thaw stability of the yeast dough further deteriorates over time. Because of the limited gas-holding capacity and limited ability to regenerate gas to replace lost gasses, the quality of a proofed frozen raw dough is compromised.

One solution to overcome the gas holding and yeast vitality challenges is to produce the raw dough without proofing and with substantially higher amounts of yeast than in a typical bakery process. The dough is stored frozen until use, and is thawed and proofed before baking. Proofing the dough after frozen storage and immediately prior to baking avoids gas losses and better retains yeast activity throughout frozen storage, resulting in a desired volume, texture, and flavor of the final bakery product. However, thawing and proofing of the dough prior to baking is very time consuming and becomes a drawback to the consumer or user of the dough. Home bakers and restaurants may find long wait times inconvenient, as dough is not readily available for baking at all times.

It is against this background that the present disclosure is made.

SUMMARY

The present application provides methods and compositions for proofed frozen raw dough, where the proofed frozen dough comprises a dough mixture of flour, water, and optionally additives; gas bubbles dispersed throughout the dough matrix; a spent yeast component; and a preserved yeast component. According to some aspects, the preserved yeast component includes encapsulated yeast, fat-coated yeast, non-hydrated active dry yeast, non-hydrated instant yeast, non-hydrated semi-dry yeast, non-hydrated frozen yeast, or a combination thereof. A frozen dough product can be prepared by mixing dough ingredients to produce a dough composition, where the dough ingredients include water, flour, a first yeast, and a second yeast; proofing the dough, where during proofing the first yeast is spent and the second yeast is preserved; and freezing the dough after proofing.

DETAILED DESCRIPTION

Figure 1:
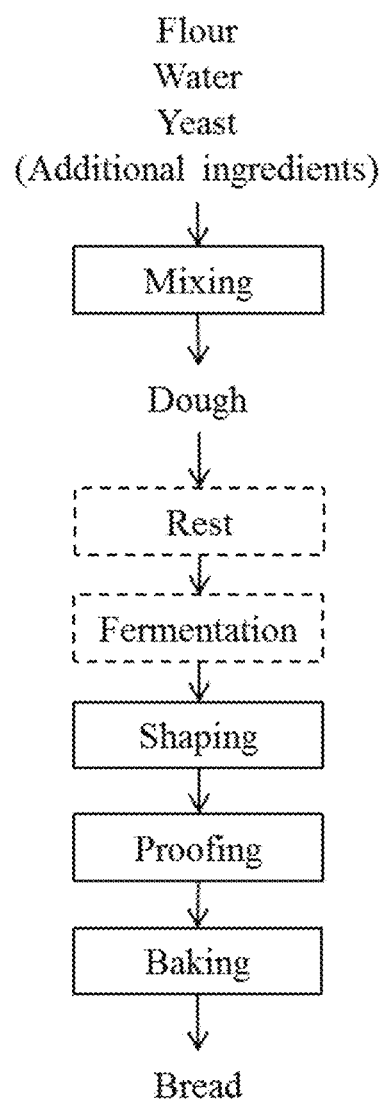
FIG. 1 shows a typical process for preparing yeast leavened bread.

The present disclosure relates to frozen dough products and methods for making the same. The present disclosure further relates to methods for making frozen dough products and bakery products from frozen dough. In particular, the present disclosure relates to frozen dough products that have been proofed and that include a spent yeast portion and a preserved yeast portion.

The term "spent yeast" is used here to refer to yeast that has gone through an active metabolic phase in proofing and is no longer viable. Spent yeast contains minimal or no viable (live) yeast cells and is not capable of further metabolic activity (e.g., fermentation).

According to embodiments of the present disclosure, the dough composition is prepared with a dough base. In the embodiments, the dough base is prepared with a first yeast and a second yeast. During proofing, the first yeast is metabolically active, consuming sugars and producing carbon dioxide, and becomes a spent yeast component. The second yeast is not active during the proofing step to any significant degree (i.e., is not available), and becomes a preserved yeast component after proofing. The second yeast (e.g., the preserved yeast component) is capable of providing the bakery product with additional leavening (e.g., gassing power) during and after frozen storage, such as during freeze-thaw cycles in storage or transportation, when the dough is transferred to refrigerated conditions or into other applications, during baking, or optional additional fermentation or proofing steps.

The terms "fermenting" and "fermented dough" are used here to refer to yeast dough undergoing or having undergone at least some fermentation, such as a first rise, second rise, or proofing, to leaven the dough. The optimum temperature for yeast fermentation is typically about 75 to 85° F. (about 24 to 29.5° C.), depending on dough type.

The term "proofing" is used here to describe a final fermentation step before baking in the preparation of yeast-leavened baked goods. Unless otherwise specified, the term "proofing" as used here refers to a full proofing step, where substantially all of the available vital yeast in the dough is used up during fermentation and becomes spent yeast, and where the dough is leavened to a state that is ready for baking. When dough is proofed, the fermentation reaches an end point before which the dough would be considered under-proofed, and after which the dough would be over-proofed. Under-proofed dough has a denser interior structure and may result in a hard or tough final product. Over-proofed dough will easily collapse and cannot hold its shape. In proofed dough, the yeast will be near the end of its metabolic activity but may still have some (minimal) activity left for a final for oven spring. Proofing is typically performed at an elevated temperature and humidity, e.g., about 75 to about 115° F. (about 24 to about 46° C.) or about 90 to about 110° F. (about 32 to about 43° C.), and relative humidity of about 60 to about 90%. Proofing can be done in a proofer, such as a temperature and humidity controlled room or cabin.

The term "proofed dough" is used here to refer to a dough that is in its final shape and ornamental design, and has undergone a proofing step and is ready to bake.

The terms "resting" and "rested dough" are used to refer to allowing the dough to rest for a period of time (e.g., from a few minutes up to an hour) but without allowing any significant fermentation to occur. Resting is typically performed at ambient temperature, e.g., at about 60 to about 75° F. (about 15.5 to about 24° C.).

The terms "yeast leavened dough" and "yeast leavened bakery products" are used here to describe dough and bakery products that include yeast for producing gas bubbles in the dough for leavening. Yeast leavened dough and yeast leavened bakery products may optionally include an additional leavener, such as a chemical leavener, to impart additional leavening to the product.

Yeast leavened dough, as described here, comprises a dough base. The dough base may be any typical dough base used for yeast leavened bakery products. Typical dough bases include flour, water, salt, and optionally fats, leavener, flavorants, preservatives, dough conditioners or enhancers, or combinations thereof.

The term "fermentation" is used here to describe a rising of the dough due to yeast activity, where yeast consumes sugars in the dough and produces carbon dioxide gas. "Fermentation" can be used to describe a first, second, or subsequent fermentation step in the preparation of yeast-leavened baked goods.

The term "about" is used here in conjunction with numeric values to include normal variations in measurements as expected by persons skilled in the art, and is understood to have the same meaning as "approximately" and to cover a typical margin of error, such as ±5% of the stated value.

A schematic flow diagram of a typical yeast leavened bakery good preparation process is shown in FIG. 1. Dry ingredients (e.g., flour, salt, and other optional ingredients) are mixed in a mixer. Water or other liquid and yeast (e.g., cream yeast) are added and the resulting mixture is mixed (e.g., kneaded) for several minutes. For example, the dough can be mixed for a period of time, e.g., about 1 minute, at low speed (about 45 rpm) and for another period of time, e.g., about 5-9 minutes, at high speed (about 80 rpm). The temperature of the dough can be controlled by adding the liquid at a higher or lower temperature than room temperature. A commercially produced dough is typically mixed in a large stand mixer, such as those available from Hobart Corp. in Troy, Ohio.

During the preparation process, the dough may be allowed one or more rest periods. After resting, the dough can be allowed to rise in one or more fermentation steps. The dough may be deflated before and/or after each fermentation step. During fermentation, the yeast consumes sugars in the dough and produces carbon dioxide gas, which causes the dough to rise and the volume of the dough to increase. Some of the yeast may become spent during the one or more fermentation steps. Typically, substantially all of the yeast is spent by the end of the final fermentation step (i.e., proofing).

The fermentation steps can be controlled by controlling the temperature of the dough and by controlling the temperature and humidity of the environment. For example, the dough may be prepared with warm liquid (e.g., warm water) such that the temperature of the dough is about 75 to about 98° F. (about 24 to about 36.6° C.). The dough may then be maintained at a temperature of about 75 to about 90° F. (about 24 to about 32° C.) and relative humidity of about 60 to 90% during the fermentation step. The duration of the fermentation step depends on the type of dough (e.g., dough moisture content, or type of bakery product), the type of yeast used, the amount of yeast, yeast vitality and activity, the temperature, and the extent to which fermentation is allowed to progress. Higher temperatures generally result in faster fermentation. However, different fermentation speeds usually result in different flavor profiles, and it may be desirable to use a slower fermentation process to produce a specific, desired flavor profile. Slower fermentation can be achieved, for example, by using a lower temperature, e.g., about 60 to about 70° F. (about 15.5 to about 21° C.) or even lower.

In what is known as a "sponge dough" process, a sponge is first prepared and fermented prior to mixing in further ingredients to prepare the dough. To differentiate from the sponge dough process, the process that does not involve using a sponge is sometimes referred to as the "straight dough" process. The sponge is generally a loose, high-moisture starter that typically includes flour, water and yeast. The sponge can be fermented at a relatively low temperature for several hours. After fermentation of the sponge, final dough ingredients are added to prepare the dough, which typically include at least water, flour, and salt and optionally other flavoring ingredients. The dough may be kneaded, and may further undergo one or more rest and fermentation steps.

Another alternative dough preparation process, sometimes referred to as the "no time dough," involves only mixing the dough base and proceeding directly to shaping the dough without intermediate fermentation steps.

The dough is shaped into a desired shape, such as a bread loaf, sandwich bread (e.g., a loaf baked in a pan), boule, baguette, Italian bread, rolls, buns, bread sticks, pup loaves, pizza crust, flat bread, etc. The shaping of the dough can be referred to as the "make-up." The shaped dough is then proofed. Proofing can be done at an elevated temperature and humidity, such as a temperature of about 80 to about 110° F. (about 26.5 to about 43° C.) and about 60 to about 90% relative humidity. In commercial operations, proofing is often done in a proofer or proofing chamber that maintains the desired environmental conditions during the proofing step. An example of a commercially available proofer is the REVENT Proofer available from Revent Inc. in Piscataway, N.J. The proofing step may last anywhere from 30 minutes to several hours, depending on the conditions and on how much yeast activity remains in the dough. A dough that has been minimally fermented (or not fermented at all) prior to the proofing step may require a longer proofing time.

Typically a proofed dough is baked immediately or shortly after proofing to avoid loss of the volume gained during proofing.

The yeast most commonly used in commercial bakery operations is cream yeast. Cream yeast consists of suspended yeast cells in liquid. Other commonly available forms of yeast include compressed yeast, which is fresh yeast compressed into a block and can be used as a compressed crumbled yeast, compressed cake yeast, semi-dry yeast, frozen yeast, and dry yeast, which is available as active dry yeast or instant yeast. Active dry yeast includes live yeast cells in granules covered by dead cells. Active dry yeast typically needs to be rehydrated to be activated. Instant yeast is similar to active dry yeast, except that the granules are smaller and include a higher relative amount of live yeast cells. Semi-dry yeast and frozen yeast are available as frozen granules, and is generally used for preparing frozen unproofed dough. The different yeast types can be classified based on their moisture content. Typically, cream yeast has a moisture content of about 82 to about 83%; compressed yeast has a moisture content of about 65%; semi-dry yeast and frozen yeast have a moisture content of about 20%; active dry yeast has a moisture content of about 7%; and instant yeast has a moisture content of about 5%.

Encapsulated yeast has been developed to improve storage stability of yeast. Encapsulated yeast includes granules of yeast cells coated or encapsulated in a fat or lipid based layer. Early development of encapsulated yeast was focused on preventing air oxidation of yeast. U.S. Pat. No. 2,523,483 issued to Stern in 1947 describes coating granules of dry yeast with a stable shortening. Further developments have been recorded in U.S. Pat. Nos. 4,719,114 to Percel (disclosing coating dry yeast with polyethylene glycol), 5,707,669 to Soltis et al. (yeast granules coated with a thermoplastic lipid material), 6,616,954 to Dally et al. (disclosing coating dry yeast with low molecular weight polyethylene glycol), 6,835,397 to Lee et at. (controlled release encapsulation with an emulsifiable lipid), and U.S. Application Publication No. US2003/0175382 to Dally et al. (disclosing yeast granules coated with low temperature melting lipids).

Encapsulated yeast is primarily used in various dry mixes, such as bread and pizza mixes. In addition to the patents discussed above, uses of encapsulated yeast have also been disclosed in U.S. Pat. No. 6,261,613 to Narayanaswamy et al. (disclosing cold-stored batters including encapsulated yeast). Encapsulated yeast has also been used in frozen dough compositions (e.g., Soltis et al., Lee et al., and Dally et al.), where non-proofed dough is frozen and proofed only after frozen storage.

Encapsulated yeast is commercially available from, for example, Maxx Performance Inc. in Roanoke, Va.

Home bakers, restaurants, and other food service facilities alike have a desire to be able to bake yeast leavened bakery goods, such as bread and pizza, from pre-prepared dough that does not require long thawing and/or proofing times. Conveniently, such bakery goods can be baked from frozen dough. However, typically a frozen yeast dough will require thawing and proofing prior to baking—a process that may take several hours—to produce satisfactory results. When typical yeast dough is proofed prior to freezing, the freezing and possible freeze-thaw cycles during storage and transportation may result in poor rising and inferior quality of the final product.

The present disclosure provides for a composition and method that allows freezing a fully proofed dough that can be baked without further wait times, such as another proofing step, and without a loss of volume or quality. The present disclosure also provides for a composition and method for preparing a proofed frozen dough that can be converted to a refrigerated dough as a freezer-to-refrigerator-to-oven dough. The proofed frozen dough can also be converted to a retarded freezer-to-refrigerator-to-freezer-to-oven dough. The bakery products produced using the composition and/or method of the present disclosure exhibit improved freeze-thaw stability, improved rising properties, and enhanced cell openings in the finished product.

Yeast strains vary slightly in their preference for environmental parameters, such as temperature, moisture, and sugar concentrations. *Saccharomyces cerevisiae,* the most commonly used baking yeast, prefers a fermentation temperature of about 80 to about 95° F. (about 26.5 to about 35° C. When yeast is not actively fermenting, it can tolerate temperatures ranging from deep frozen up to its thermal death point, about 130 to about 140° F. (about 54 to about 60° C.). However, freezing temperatures, particularly in the presence of free water, can damage yeast and impact yeast vitality.

Yeast vitality affects frozen dough and performance of the frozen dough through baking. Whether the dough is fermented before freezing or not, the existence of vital yeast in the dough that is capable of surviving freezing conditions is directly correlated with product quality. Harsh freezing conditions, and freeze-thaw cycles in particular, have a negative impact on yeast vitality and subsequent yeast activity. Frozen storage damages yeast cells by causing physical damage to the cells. For example, water around yeast cells will form ice that damages the yeast cells. Yeast in a non-fermented, non-proofed dough has been found to lose about 20 to 40% of its activity after one week of frozen storage at −20° F. (−29° C.). On the other hand, yeast in a proofed dough has been found to lose about 80% of its activity after one week of frozen storage at −20° F. (−29° C.). Dry yeast is more stable and capable of resist freeze damage. However, yeast fermentation requires moisture, and dry yeast must be reconditioned with water prior to fermentation and proofing.

Full proofing, while resulting in desired volume, flavor, and texture characteristics, uses up active yeast, and little yeast activity is expected to remain after proofing, whether before or after freezing.

Dough can be proofed prior to freezing in an effort to save time at the back end to allow baking of the dough without another proofing step. However, proofed dough retains diminished gas-holding capacity and may collapse as a result. Since the proofing step has used up substantially all vital yeast, no yeast activity remains to replace any lost volume either before or during baking.

Par-proofing is known as a proofing step that provides less than full proofing. However, full flavor and volume development is not achieved by par-proofing. Another drawback of par-proofing is that it makes the yeast more vulnerable and renders the metabolized yeast unable to survive harsh freezing conditions, causing a higher fatality rate of yeast. This in turn results in loss of yeast activity and gassing power in the final proofing step and/or final leavening action during baking.

When dough is frozen without first proofing the dough, yeast activity is preserved better than in processes with proofing steps prior to freezing. Yeast that remains active after frozen storage can then be used in the proofing step prior to baking. However, proofing before baking requires bringing the dough up to a suitable proofing temperature (about 90 to about 110° F. (about 32 to about 43° C.)), and waiting for the proofing step to complete. This may take several hours.

The present disclosure provides for a dough composition that is proofed prior to freezing and frozen as a raw, proofed dough. The dough is baked after freezing, for example by a deli, a restaurant, a cafeteria, an institutional kitchen, a store, or by a consumer. The frozen dough composition comprises a spent yeast component and a preserved yeast component. The spent yeast is used during proofing whereas the preserved yeast is not used but instead reserved during proofing. The preserved yeast component is capable of being activated and producing carbon dioxide gas either during possible freeze-thaw cycles, when converted to a refrigerated dough (e.g., when transferred to refrigerated storage from frozen storage), during baking and/or during an additional fermentation or proofing step.

The second yeast is unavailable during the proofing step and is preserved through the proofing step. In some embodiments, the second yeast is made unavailable by encapsulating the yeast ("encapsulated yeast") or by coating the yeast ("coated yeast") or by substantially or partially encapsulating or coating the yeast. The yeast may also be made unavailable by using non-activated active dry or instant yeast that requires reactivation to become active, or by delayed addition of the yeast. The non-activated active dry or instant yeast can be mixed into the dough without first hydrating the yeast in water, and by delayed addition of the yeast. The yeast may also be made unavailable by delayed addition of the non-hydrated semi-dry yeast, or frozen yeast. The yeast hydrates slowly within the dough and remains substantially inactive during the fermentation and proofing steps. The yeast may also be made unavailable by not mixing the yeast in until after the formation of the dough, after fermentation, or even after proofing. In one embodiment, the second yeast is added before make-up and proofing but is preserved through the proofing step. Once proofed, the dough may be in an ornamental design (e.g., a final shape and form) that is ready to be baked without further remixing or reshaping to disturb the dough matrix.

The dough may be provided in its final shape and form prior to freezing, without further proofing to restore the volume of the dough. However, according to some embodiments, some rising may occur when the temperature of the dough rises above freezing, such as during freeze-thaw cycles during storage or transportation, or when the dough is transferred to a refrigeration temperature, or removed from the freezer to be baked. If a second proofing step is included (e.g., after freezing), the preserved yeast component can be activated to provide leavening.

The term "coated yeast" or "fat-coated yeast" is used here to refer to yeast that has been coated with a fat, such as palm oil or shortening or another suitable fat. The coated yeast differs from encapsulated yeast in that encapsulated yeast is typically available as a flowable granulated material, whereas coated yeast may be present in a mass of yeast and fat coating without the presence of separate granules. Coated yeast can be prepared using a mixer and mixing active dry yeast, instant yeast, semi-dry yeast, or frozen yeast with fat at a ratio of about 1:0.5 to about 1:10 by weight at room temperature until the yeast and fat are well mixed. The yeast may also be partially or substantially coated or encapsulated.

According to embodiments of the present disclosure, the dough composition is prepared with a dough base comprising a first yeast and a second yeast.

According to an embodiment, the dough base comprises an aqueous liquid, such as water. The dough base may comprise, for example, at least about 10, 15, 20, 25, or 30% aqueous liquid by weight. The dough base may comprise less than about 60, 55, 50, 45, 40, or 35% aqueous liquid by weight. According to some embodiments, the dough base comprises about 10 to about 60% water by weight, about 15 to about 55% water by weight, about 20 to about 50% water by weight, about 25 to about 45% water by weight, about 30 to about 40% water by weight, or about 30 to about 35% water by weight. In one embodiment, the dough base comprises about 32%, about 33%, or about 34% water by weight. The aqueous liquid may also comprise another liquid, such as milk or other dairy-based liquids (e.g., whey), broth, or a vegetable or legume based liquid, such as juice, soy milk, almond milk, etc. These amounts are understood to refer to added liquid. Some amount of moisture is also added in the form of the flour, as the moisture content of flour (e.g., wheat flour) may average about 10 to about 15% moisture by weight.

According to an embodiment, the dough base comprises flour, such as grain flour (e.g., wheat, oat, barley, rye, rice, corn, quinoa, millet, sorghum, triticale, amaranth, buckwheat sesame, flax, hemp, poppy, chia, and the like). Examples of flours include but are not limited to wheat flour (e.g., hard red, soft red, hard white, soft white, durum, etc.), barley flour, buckwheat flour, corn flour, corn meal, spelt flour, soy flour, millet flour, flaxseed flour, potato flour, potato starch flour, quinoa flour, rice flour, rye flour, sorghum flour, tapioca flour, and combinations thereof. In preferred embodiments, the flour includes wheat flour. In some preferred embodiments, the flour comprises 50% or more of wheat flour. In some embodiments, at least a portion of the flour is whole grain flour. The total amount of flour in the dough base depends on the desired moisture level of the dough and the intended food product. The dough base may comprise, for example, at least about 25, 30, 34, 36, 38 or 40% flour by weight. The dough base may comprise less than about 70, 65, 60, 55, 50, 45, or 40% flour by weight. According to some embodiments, the dough base comprises about 40 to about 70% flour by weight, about 45 to about 65% flour by weight, about 50 to about 65% flour by weight, or about 55 to about 65% flour by weight.

According to some embodiments, the dough base comprises fats, such as oils, hard fats, and mixtures thereof. Examples of oils include but are not limited to canola oil, rapeseed oil, sunflower seed oil, peanut oil, coconut oil, soybean oil, palm oil, olive oil, and the like. Examples of hard fats include but are not limited to butter, vegetable shortening, lard, palm oil, and the like. Fats used herein refer to added fats, excluding fats that may be found in, e.g., flour. The dough base may comprise, for example, at least about 0.1, 1, 2, 3, 4, 5, 6, 7, 8, 10, or 12% fat by weight. The dough base may comprise less than about 16, 14, 12, 10, 8, 6, 4, or 2% fat by weight. For example, the dough base may comprise about 0.1 to about 16% fat by weight, about 1 to about 14% fat by weight, or about 2 to about 12% fat by weight.

According to embodiments, the dough base may comprise salt and other flavoring ingredients. Examples of salt include but are not limited to sodium salts, potassium salts, magnesium salts, manganese salts, and mixtures thereof. Commercially available salts include but are not limited to table salt, iodized table salt, kosher table salt, sea salt, fleur de sel, smoked salt, and finishing salt. The dough base may comprise, for example, at least about 0.1, 0.5, 0.75, 1.0, 1.25, 1.5, 1.75, or 2.0% salt by weight. The dough base may comprise less than about 3.5, 3.0, 2.5, 2.0, 1.75, 1.5, 1.25, or 1.0% salt by weight. For example, the dough base may comprise about 0.1 to about 3.5% salt by weight, about 0.5 to about 3.0% salt by weight, about 0.5 to about 2.5% salt by weight, about 0.5 to about 1.75% salt by weight, about 0.5 to about 1.5% salt by weight, about 0.75 to about 2.5% salt by weight, about 1.0 to about 3.0% salt by weight, about 1.25 to about 3.0% salt by weight, about 1.5 to about 3.0% salt by weight, about 1.75 to about 3.0% salt by weight, or about 2.0 to about 3.5% salt by weight. Other flavoring ingredients may include seasonings such as herbs, spices, tomato, garlic, pepper, honey, mustard, barbeque, ranch, onion, bacon, cheddar cheese, parmesan, and the like. The dough base may comprise, for example, from 0 to about 8% or from about 1 to about 4% other flavoring ingredients by weight.

The dough base may also comprise one or more sweeteners. Suitable sweeteners include, for example, sugar, honey, agave nectar, maple syrup, corn syrup, high fructose corn syrup, buckwheat honey, and the like. Examples of sugar include but are not limited to cane sugar, brown sugar, granulates, powdered sugar, raw sugar, fructose, dextrose, and combinations thereof. Artificial sweeteners or sweeteners derived from natural sources (e.g., stevia leaf extract and certain sugar alcohols, such as sorbitol, xylitol, and mannitol) can also be used. The dough base may also include an acidifier, such as vinegar, cider vinegar, or food grade mineral acids.

The dough base may further comprise inclusions, such as pieces of fruit (e.g., dried fruit, such as apples, pears, apricots, peaches, plums, strawberries, blueberries, cranberries, etc.), nuts (e.g., pecans, walnuts, peanuts, cashews, macadamia nuts, brazil nuts, hazelnuts, almonds, etc.), vegetables (e.g., dried vegetables, such as potatoes, carrots, corn, beets, peppers, etc.), or cheese. For example, the dough base may include about 1 to about 10% inclusions.

According to embodiments, the primary leavener in the dough composition is yeast. The yeast can be added to the dough in a suitable leavening amount, depending on the desired end product. For example, the dough base for a pizza dough may include a total amount of up to about 8% yeast by weight, or about 1 to about 6% yeast by weight. The dough base for a bread dough may include up to about 6% yeast by weight, or about 1 to about 4% yeast by weight. The amount of the first yeast may vary based on the type of yeast used. For example, if the first yeast is cream yeast, the amount of first yeast in the dough may be about 1.5 to about 9 wt-%, about 2 to about 8 wt-%, or about 2.5 to about 7 wt-% based on the weight of the dough base. Cream yeast has a yeast solids content of about 18%. If the first yeast is a compressed yeast, the amount of first yeast in the dough may be about 0.5 to about 7 wt-%, about 0.75 to about 6 wt-%, or about 1 to about 5 wt-% based on the weight of the dough base. Compressed yeast has a yeast solids content of about 30%. The first yeast may also be a combination of yeast types.

The amount of the second yeast may be about 0.1 to about 2.5 wt-%, about 0.1 to about 2.0 wt-%, about 0.1 to about 1.5 wt-%, or about 0.1 to about 1.0 wt-% based on the weight of the dough base. If the second yeast is a coated yeast (e.g., encapsulated yeast or fat-coated yeast), the amount of the second yeast can be adjusted based on the amount of coating material that is present. Active dry yeast and instant yeast have a yeast solids content of about 92% and about 95%, respectively, without coating.

The total amount of yeast in the dough base may be about 2 to about 12 wt-%, about 3 to about 9 wt-%, or about 4 to about 6 wt-% based on the weight of the dough base.

In the embodiments, the first yeast, which is activated during fermentation and proofing steps and becomes the spent yeast component, may comprise cream yeast, compressed yeast, semi-dry yeast, frozen yeast, active dry yeast, instant yeast, or a combination thereof.

The second yeast, which becomes the preserved yeast component in the proofed dough, may comprise encapsulated yeast, fat-coated yeast, active dry yeast without prehydration, or instant yeast without prehydration, or semi-dry yeast without prehydration, or frozen yeast without prehydration. The encapsulated yeast or fat-coated yeast may include active dry yeast, instant yeast, semi-dry yeast, or frozen yeast as the base yeast. The second yeast may be added into the dough at the beginning of mixing, during mixing, toward the end of mixing (e.g., during the last 1 to 2 minutes of mixing), or in a subsequent mixing step. The first and second yeasts can be added to the dough simultaneously. If the yeasts are added separately, the second yeast can be added within about 20 minutes of adding the first yeast, or within about 10 minutes of adding the first yeast. In at least some embodiments, the second yeast is added to the dough before fermentation of the first yeast occurs (e.g., before fermentation or proofing). In preferred embodiments, the second yeast is added to the dough at the beginning of mixing or during mixing.

If the second yeast is added to the dough after fermentation and the dough matrix is remixed to incorporate the second yeast, the air cell structure developed during fermentation will be damaged. The product would need to be proofed again to develop air cells before baking, causing inconvenience to the end user. If instead the re-mixed fermented dough was baked without further fermentation or proofing, the process would result in an inferior quality product due to the damaged air cells and lack of flavor development.

In contrast, by adding the first and second yeasts before fermenting or proofing, and by making the second yeast unavailable during fermentation or proofing, an improved quality bakery product can be produced, exhibiting full flavor development, high rising, and large air cell opening. While the first yeast is used to proof the dough, the second yeast is preserved and becomes available/active after frozen storage. The dough can be baked from directly frozen state, from refrigerated state, or be optionally subject to further proofing before baking, if so desired.

In some embodiments, the bakery product includes a chemical leavener, such as baking soda (sodium bicarbonate) or baking powder. However, in a preferred embodiment, the bakery product does not include a chemical leavener. In some embodiments, the bakery product includes less than 5%, less than 1% or less than 0.5% of a chemical leavener. In some embodiments, the bakery product is substantially free of a chemical leavener.

Figure 2:
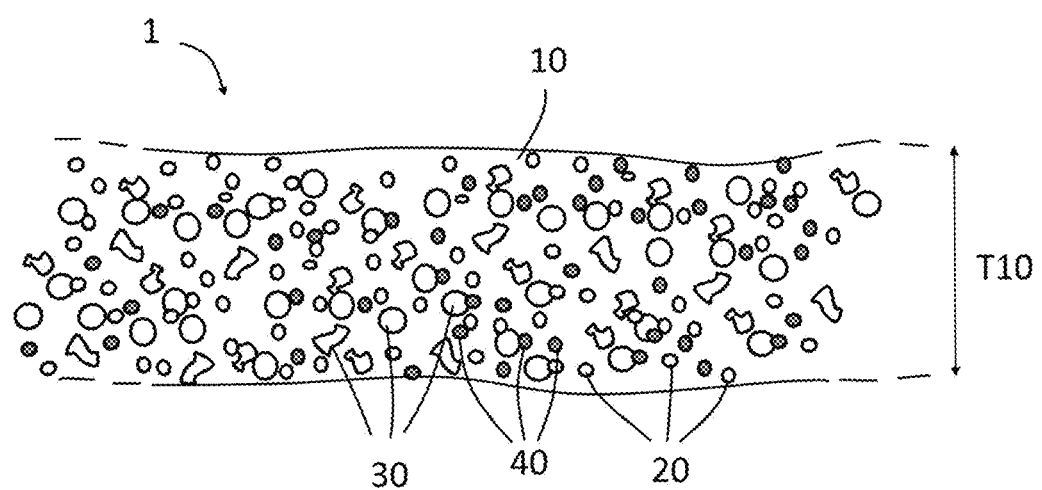
FIG. 2 shows a schematic drawing of a bakery product according to an embodiment.

According to some embodiments, the dough of the bakery product defines a matrix. A schematic depiction of the dough matrix is shown in FIG. 2. In some embodiments, the bakery product 1 is a frozen proofed dough that has a dough matrix 10, comprising gas bubbles 30 that are dispersed throughout the matrix. The term proofed dough is used here to refer to dough that is ready to be baked. In some embodiments, the bakery product 1 is a refrigerated proofed dough or a slacked dough. The term refrigerated proofed dough is used here to refer to dough that has not been frozen, but instead is refrigerated after proofing. A dough that is frozen and then refrigerated can be referred to as "freezer-to-refrigerator-to-oven" dough or as slacked dough. The dough matrix further comprises spent yeast cells 20 and preserved yeast cells 40 dispersed throughout the matrix. As shown in FIG. 2, the dough matrix 10 has a thickness T10.

Figure 3:
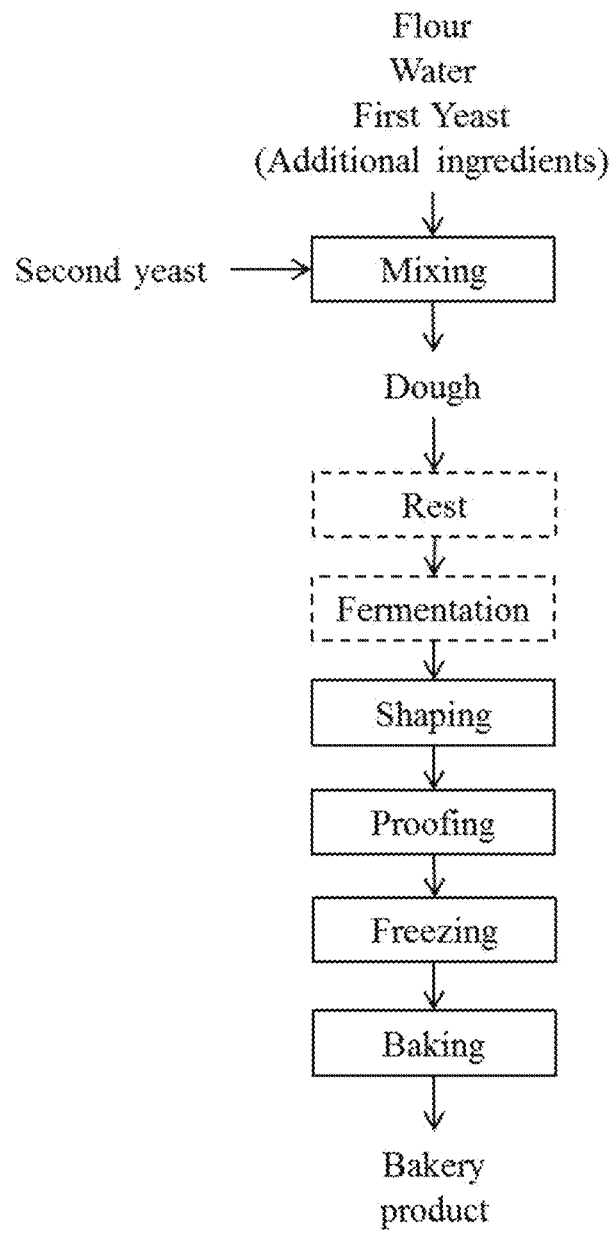
FIG. 3 is a flow chart of a method for preparing yeast leavened bakery products according to an embodiment.
Figure 4A:
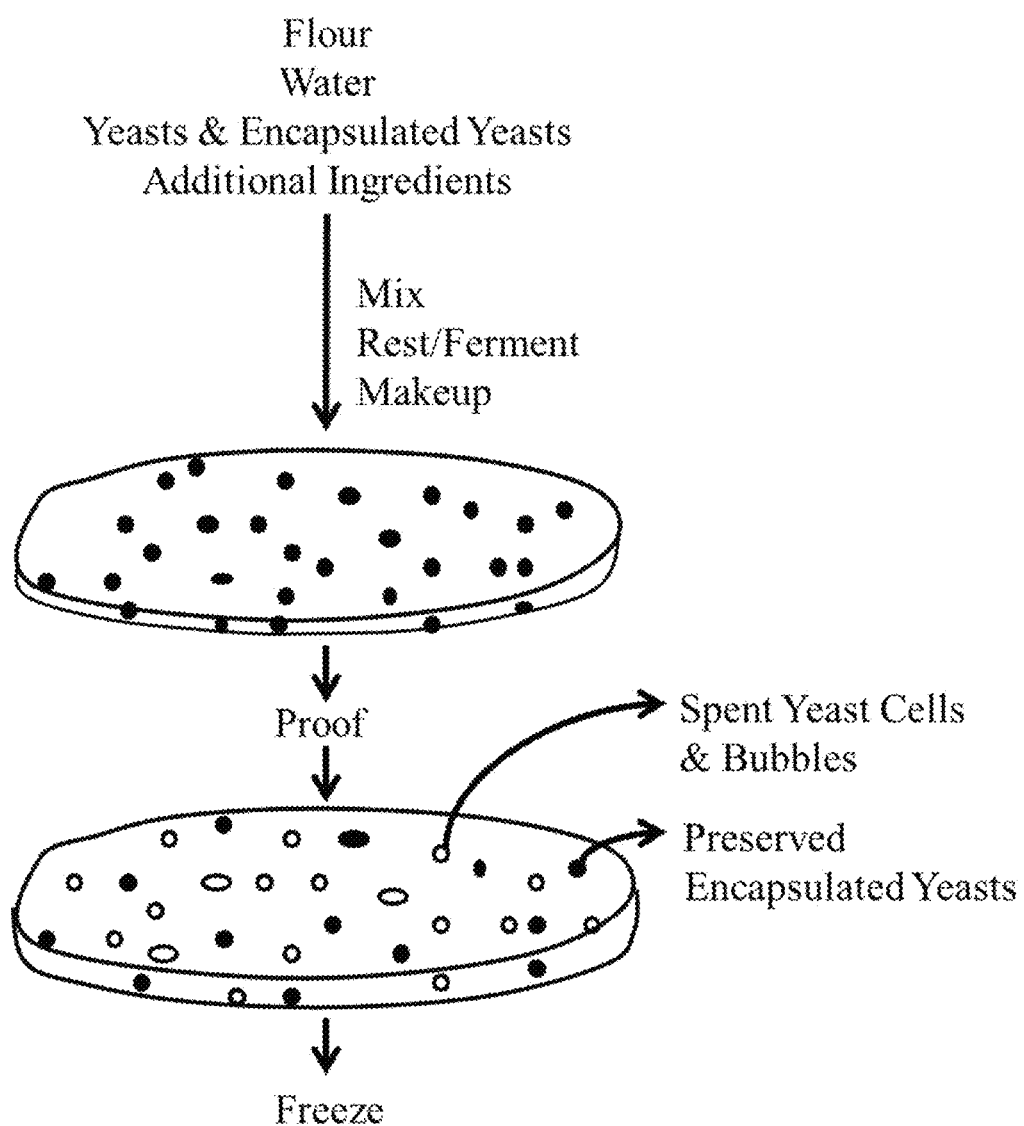
FIGS. 4A and 4B show the formation of products according to the method of FIG. 3.
Figure 4B:
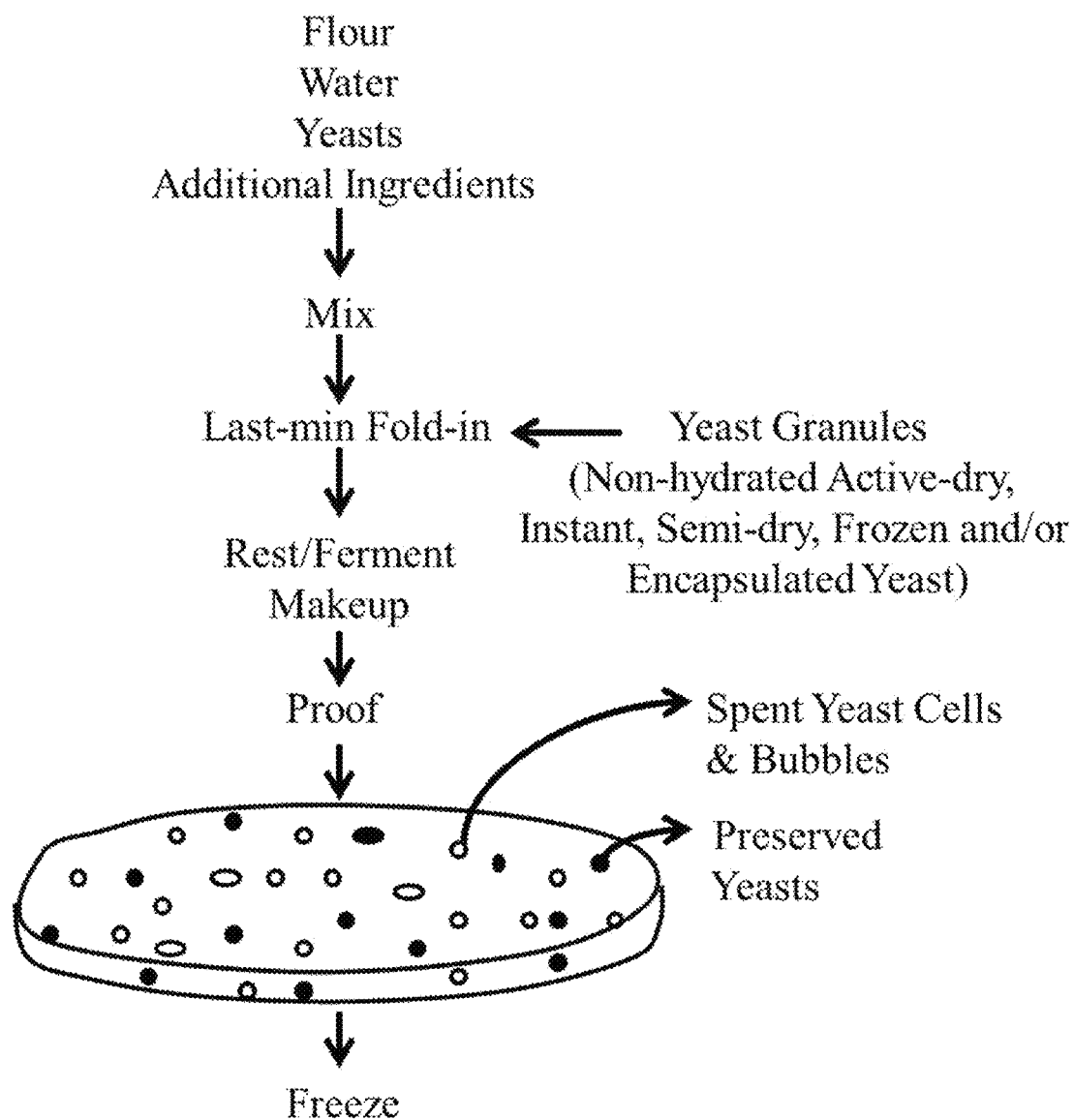

Simplified schematics of the method for preparing the bakery product according to an embodiment are shown in FIGS. 3 and 4A-4B. The dough composition is prepared by mixing together the ingredients for the dough base, including the first and second yeast. The mixing may be done by mixing the dry ingredients (e.g., flour, salt, and other dry ingredients) separately, and then mixing the dry ingredients with the wet ingredients (e.g., water, cream yeast). The mixing may include a kneading step. For example, the dough can be mixed in a stand mixer for about 5 to about 15 minutes, or about 7 to about 12 minutes. The dough can be first mixed at a low speed for a first length of time (e.g., about 1 minute), and then at a medium or high speed for a second length of time (e.g., about 6 or about 7 minutes). Dough for bread may be mixed longer, about 8 to about 12 minutes. FIGS. 4A and 4B show a schematic flow chart of the making and formation of the product with spent yeast component, bubbles, and a preserved yeast component.

In some embodiments, some or all of the ingredients for the dough base are mixed together prior to adding the second yeast. In other embodiments, the second yeast is added to the other dough base ingredients (e.g., dry ingredients) and mixed into the dough. In some embodiments, the second yeast is encapsulated yeast, and the encapsulated yeast is added to the dough mixture at an intermediate time point during mixing to reduce the mixing action on the encapsulated yeast. In another embodiment, the encapsulated yeast is added at the beginning of mixing, but the amount of mixing is reduced. In some embodiments, the second yeast is an active dry yeast, or an instant yeast, semi-dry yeast, or frozen yeast added into dough in granular form without prehydration, or coated with shortening before adding into the dough. The yeast granules or coated yeast can be added to the dough during the last minute or last few minutes of mixing.

The dough may be allowed to rest for a period of time, e.g., for about 5 to about 20 minutes, prior to further processing. After resting, the dough can be allowed to rise in one or more fermentation steps. The dough may be deflated before and/or after each fermentation step. Alternatively, the dough may be prepared as a "no time dough" by mixing the dough base and proceeding directly to shaping the dough without intermediate fermentation steps.

The dough is shaped into a desired shape in a make-up step. Exemplary shapes include a bread loaf, sandwich bread (e.g., a loaf baked in a pan), boule, baguette, Italian bread, rolls, buns, bread sticks, pup loaves, pizza crust, flat bread, etc. If the dough is shaped into pizza crust or flat bread, it may be mechanically shaped (e.g., sheeted pressed) and cut into shape.

The shaped dough is then proofed. Proofing can be done at an elevated temperature and humidity, such as a temperature of about 80 to about 110° F. (about 26.5 to about 43° C.), about 85 to about 105° F. (about 29.5 to about 40.5° C.), or about 90 to about 100° F. (about 32 to about 38° C.), and at about 60 to about 90% relative humidity. The proofing may be done in a proofer or proofing chamber. At the end of proofing, first yeast is substantially spent ("spent yeast") while at least a majority of the second yeast remains preserved ("preserved yeast"). In some embodiments, at least 75%, at least 78%, at least 80%, at least 85%, at least 90%, at least 95%, or at least 98% of the first yeast is spent during the proofing step (e.g., a first proofing step). In some embodiments, at least 50%, at least 55%, at least 60%, at least 65%, at least 68%, at least 70%, at least 75%, at least 80%, at least 85%, at least 90%, or at least 95% of the second yeast remains preserved throughout the proofing step (e.g., the first proofing step).

In some embodiments, the dough is compressed or deflated during or after proofing and before freezing. For example, the dough may be compressed or deflated after about ¾ of the proofing (e.g., after about 45 minutes of proofing), and be proofed further after compression or deflation (e.g., be proofed for another 15 minutes). Compressing or deflating the dough is used here to refer to briefly pushing down on the proofed dough to deflate the dough. The dough can be compressed manually or by using a dough press. The dough press can be used to deflate the dough for about 0.1 to about 2 seconds at a pressure of about 200 to about 600 psi. Compressing the proofed dough prior to freezing has been found to result in enhanced gassing power and thus increased final product volume. It is believed that the enhanced gassing power may be caused by the physical force of compression rupturing the encapsulation around the yeast.

In an embodiment, the proofed dough is frozen. In some embodiments, the proofed dough is frozen to a temperature of about −40 to about 20° F. (about −40 to about −6.5° C.), about −35 to about 10° F. (about −37 to about −12° C.), about −30 to about 0° F. (about −34.5 to about −18° C.), or about −25 to about −10° F. (about −31.5 to about −23° C.) (e.g., about −20° F., or about −29° C.). Preferably, the proofed dough is frozen quickly, for example by blast freezing the proofed dough to about −25 to −15° F. (about −31.5 to about −26° C.) in about 25 to 40 minutes. The frozen proofed dough can be stored frozen at a temperature of about −40 to about 20° F. (about −40 to about −6.5° C.), about −35 to about 10° F. (about −37 to about −12° C.), about −30 to about 0° F. (about −34.5 to about −18° C.), or about −25 to about −10° F. (about −31.5 to about −23° C.) (e.g., about −20° F., or about −29° C.).

The frozen dough can be prepared and formulated for baking directly from frozen storage; for baking after being transferred to a refrigerator for a time period ("frozen-to-refrigerated dough"); for baking after being transferred to a refrigerator for a retardation time period and frozen again ("frozen-to-refrigerated-to-frozen" or "slacked" dough); or for baking after thawing at room temperature. The time period at refrigeration temperature can vary from a few hours to several days. For example, a frozen-to-refrigerated dough can be refrigerated for at least 6 hours, or from about 12 hours to about 7 days, or about 1 to about 5 days (e.g., about 4 days) before being baked. A frozen-to-refrigerated-to-frozen dough can be retarded (stored at refrigeration temperature) for about 2 to about 48 hours, about 4 to about 24 hours, or about 12 to about 20 hours before being frozen again.

According to embodiments, the frozen dough comprises a spent yeast and a preserved yeast. The preserved yeast may comprise encapsulated yeast, fat coated yeast, active dry yeast, or instant yeast, semi-dry yeast, or frozen yeast that has not been activated and spent during the proofing step.

Ordinarily, in order for encapsulated yeast to become activated, the encapsulation needs to be ruptured. For example, encapsulation can be damaged by mixing or by using a solvent or an elevated temperature. Surprisingly, it has been found that freezing proofed dough comprising encapsulated yeast exerted sufficient forces on the encapsulated yeast to break the encapsulation and to release the yeast. Without wishing to be bound by theory, it is hypothesized that the freezing of water near the encapsulated yeast causes rupturing of the encapsulation.

In some embodiments, the bakery product is a pizza. In making a pizza, the shaped dough can be topped with pizza toppings (e.g., sauce, cheese, and other suitable toppings) either before or after freezing. A variety of tomato based or other sauces, and a variety of cheeses and cheese blends can be used in combination with toppings selected from meat sources, fish sources, vegetable sources, or fruit sources or other typical topping materials. Pizza sauces can include a variety of ingredients including tomato portions, tomato sauce, tomato paste, white sauces (e.g., cheese sauce or garlic sauce), pesto, and seasonings including salt and spices. Cheeses can include mozzarella, Romano, Parmesan, jack and others. Commonly, cheeses in the form of shaved, crumbled or string form derived from mozzarella, Romano, Parmesan, provolone and whole milk or non-pasteurized cheeses can be used. Cheeses and cheese blends can be used both in the form of blended materials wherein two or more cheeses are blended and then applied to the crust. However, cheeses can also be added to the crust in layers without premixing.

Various meats, including Italian sausages, pepperoni, prosciutto, chicken, bacon, beef, and seafoods such as shrimp, mussels, fish, etc. can be used to form the pizza product. Suitable vegetable toppings include spinach, mushrooms, onions, garlic, bell peppers, artichokes, tomatoes, leafy greens, corn, etc. Fruit materials can also be used on the pizzas, both in a vegetarian and non-vegetarian form. Examples of fruit materials include pineapples, apples, etc. Examples of pizza products prepared according to the disclosure include Italian style pepperoni pizzas with a blended cheese topping; Italian cheese pizzas having no other meat toppings but optionally including vegetable add-ons; classic supreme pizzas including pepperoni, Italian sausage, green pepper, onion, and/or mushrooms; and southwest chicken pizzas including grilled chicken, Mexican salsa, corn, beans, and other Tejano or Mexican seasonings. A spinach and roasted mushroom pizza can also be made using rough-cut spinach and chopped and roasted mushrooms. Lastly, a bacon and blended cheese of Italian origin including mozzarella, Parmesan, and Romano can be made.

The bakery products (e.g., baguette, Italian bread, rolls, buns, bread sticks, pup loaves, pizza crust, assembled pizza with toppings, flat bread, etc.) can be packaged using conventional methods and stored frozen. The frozen bakery products may be shipped to retail outlets and maintained in frozen condition in freezer chests for purchase. The frozen products can also be converted to refrigerated products by thawing in a refrigerator and sold as deli or refrigerated dough items. Consumers can purchase the frozen bakery products and can maintain them at home in a frozen state until cooked. Alternatively, the bakery products can be used by bakeries, restaurants, cafeterias, stores, or institutional kitchens.

According to an embodiment, the frozen proofed dough comprises a spent yeast portion and a preserved yeast portion. When the proofed dough is removed from frozen storage, the frozen proofed dough can be baked immediately, whereupon the dough matrix rises and the volume expands at least in part due to the preserved yeast portion in the dough activating and producing carbon dioxide, causing the volume of the dough to increase during baking. The preserved yeast portion may also be activated if the temperature of the proofed dough increases before baking, such as during freeze-thaw cycles, refrigeration, or thawing.

The proofed dough can be tempered to allow the temperature of the proofed dough to increase before baking. The dough can be tempered at a temperature that is higher than the frozen storage temperature. For example, the dough can be tempered at a temperature of about −10° F. (−23° C.) or higher, about 0° F. (−18° C.) or higher, about 10° F. (−12° C.) or higher, about 20° F. (−6.5° C.) or higher, about 32° F. (0° C.) or higher, about 40° F. (4.5° C.) or higher, about 50° F. (10° C.) or higher, about 60° F. (15.5° C.) or higher, or about 70° F. (21° C.).

Commonly, the bakery products are removed from packaging materials and placed in an oven and cooked at a temperature suitable for the particular product. For example, bread loaves can be cooked at a temperature of about 375° F. to about 450° F. (about 190 to about 232° C.), or about 400 to about 425° F. (about 204 to about 218° C.), for about 20 to 60 minutes, or for about 25 to 45 minutes. Smaller items, such as rolls can be cooked at a temperature of about 350°

F. to about 440° F. (about 177 to about 227° C.), or about 375 to about 400° F. (about 190 to about 204° C.), for about 12 to about 30 minutes, or for about 15 to about 20 minutes. Flat breads and pizzas can be cooked at a temperature of about 375° F. to about 500° F. (about 190 to about 260° C.), or about 375 to about 425° F. (about 190 to about 218° C.), for about 15 to 35 minutes, or for about 20 to 30 minutes.

In one embodiment, the proofed dough is allowed to come to room temperature or warmer, and may undergo a second proofing step.

In the embodiments, the dough has a first volume before proofing, a second volume after proofing, and a third volume after baking. The volume of the dough here refers to the volume of a particular segment of dough, such as, for example, a made-up segment of dough that will be baked into a loaf of bread, a roll, or a pizza crust, etc. According to some embodiments, the second volume is at least about 75 to about 100% greater than the first volume. For example, the second volume may be about 100 to about 500% greater than the first volume, about 200% greater, about 300% greater, or about 400% greater, than the first volume. The volume after freezing may be the same or slightly lower than the second volume, as the dough may lose some volume during freezing. However, according to an embodiment, the volume is recovered due to activation of the preserved yeast. The frozen proofed dough comprises gas bubbles (also referred to as cell openings), which may make up about 30 to about 90%, about 35 to about 85%, about 40 to about 80%, or about 45 to about 75% of the volume of the frozen dough (e.g., the second volume). The portion of gas bubbles of the volume of the dough may depend on the type of bakery product. For example, a pizza dough typically includes about 40 to about 75% of gas bubbles by volume, whereas bread may include about 70 to about 85% of gas bubbles by volume. The third volume (volume after baking) may be at least 25, at least 50%, or at least 100% greater than the second volume. For example, the third volume may be about 75 to about 300% greater, or about 100 to about 200% greater than the second volume.

In some embodiments, the dough is proofed in a second proofing (e.g., after freezing). The dough may have a second proofing volume that is at least 0 to 20% greater than the second volume, such as about 10 to about 50% greater, or about 50 to about 100% greater than the second volume.

A baked food product produced by baking the frozen dough according to embodiments of the present disclosure has a cell structure that is formed by the baked dough matrix and gas bubbles that were trapped in the dough. The baked food product has a density of about 0.1 to about 0.5 g/mL, or about 0.2 to about 0.3 g/mL. The density of the baked food product may depend on the type of food. For example, a bread may have a density of about 0.14 to about 0.25 mg/mL, whereas a pizza crust may have a density of about 0.21 to about 0.4 mg/mL. In preferred embodiments, when the frozen dough is baked, the baked food product comprises an uneven cell structure with cells of varying sizes distributed throughout the matrix.

EXAMPLES

Various embodiments of the composition and method according to the present disclosure were tested in the following examples. Unless otherwise indicated, dough formulations were mixed by mixing together dry ingredients and then mixing wet ingredients with the dry ingredients. The dough formulations were mixed for 1 min at low speed and 7 min at high speed.

Ingredients:
Yeasts: Cream yeast (solids content about 18%)
    Active dry yeast (solids content about 93%)
    Instant yeast (solids content about 95%)
    Protected active dry yeast (active dry yeast with emulsifiers and antioxidants)
    Encapsulated yeast 80 (80% yeast)
    Encapsulated yeast 85 (85% yeast)
    Encapsulated yeast 90 (90% yeast)
    Crumbled compressed yeast (solids content 34%)
    Semi-dry yeast, and Frozen yeast (solids content 80%)
Oils and fats
Dough enhancers: lecithin, datem (diacetyl tartaric acid ester of mono-diglycerides), SSL (sodium stearoyl lactylate), ascorbic acid, enzymes, guar gum
Equipment:
Mixers, sheeter, proofer, Risograph (available from The National Manufacturing Co. in Lincoln, NE)

Example 1

Pizza crusts were prepared from dough formulations according to an embodiment and the freeze-thaw stability of the samples was compared to a control sample.

Sample preparation: dough formulations of 4000 g each were prepared according to TABLE 1 using a stand mixer. Formulation A (control) was prepared with cream yeast, formulation B with cream yeast and active dry yeast, and formulation C with cream yeast and encapsulated yeast. Cream yeast was mixed into the dough with the wet ingredients, while active dry yeast and encapsulated yeast were mixed in with the dry ingredients. After mixing the dough formulations had a temperature of about 76° F. (about 24.5° C.).

TABLE 1

|  | Formulation A (Control) | | Formulation B (Active Dry Yeast) | | Formulation C (Encapsulated Yeast) | |
| --- | --- | --- | --- | --- | --- | --- |
|  | Wt-% | Grams | Wt-% | Grams | Wt-% | Grams |
| Hard Wheat Flour | 60.4 | 2418 | 60.4 | 2418 | 60.4 | 2418 |
| Water | 28.7 | 1147 | 28.7 | 1147 | 28.7 | 1147 |
| Salt | 1.4 | 57 | 1.4 | 57 | 1.4 | 57 |
| Sugar | 1.2 | 47 | 1.2 | 47 | 1.2 | 47 |
| Cream Yeast | 5.3 | 213 | 5.0 | 202 | 5.0 | 202 |
| Active Dry Yeast | — | — | 0.30 | 12 | — | — |
| Encapsulated Yeast (85/15) | — | — | — | — | 0.36 | 13.6 |
| Shortening | 2.40 | 96 | 2.40 | 96.06 | 2.36 | 94.40 |
| Dough enhancers | 0.53 | 21 | 0.53 | 21 | 0.53 | 21 |
| TOTAL | 100 | 4000 | 100 | 4000 | 100 | 4000 |

To prepare samples A, B, and C, dough formulations A, B, and C were then sheeted with a gap setting of 2.9 mm and were triple folded twice. The dough formulations, having a final thickness of about 5.5 mm, were cut into 12 inch pizza crusts, each crust having a weight of about 500 g. The crusts were proofed for 50 min at 95° F. (about 35° C.) and 70% relative humidity. The dimensions of the crusts were measured and recorded while the crusts were allowed to rest at room temperature for about 5 min.

The crusts were then blast frozen at −20° F. (−29° C.) and stored at −20° F. (−29° C.). Each of the frozen crusts were topped with 146 g of tomato sauce and 190 g of mozzarella cheese. The topped crusts were stored frozen at −20° F. (−29° C.) and subjected to freeze-thaw treatment.

Freeze-thaw treatment: In one cycle of freeze-thaw treatment, the crusts were removed from frozen storage and transferred to 36° F. (2° C.) for 4 hours per day, and then transferred back to −20° F. (−29° C.). In Example 1, the crusts were subjected to 21 cycles of freeze-thaw treatment.

Baking: after freeze-thaw treatment, the pizzas were baked at 400° F. (204° C.) for 20-22 min. After baking, the crust rising heights were again recorded.

Results of the tests are shown in TABLE 2.

TABLE 2

|  | Sample A (Control) | Sample B (Active Dry Yeast) | Sample C (Encapsulated Yeast) |
| --- | --- | --- | --- |
| After Sheeting | | | |
| Weight (g) | 580.0 | 610.0 | 560.0 |
| Thickness (mm) | 5.5 | 5.5 | 5.5 |
| Length (in) | 12.5 | 12.0 | 12.0 |
| Width (in) | 12.3 | 12.0 | 12.0 |
| After Proofing | | | |
| Thickness (mm) | 11.0 | 11.0 | 11.5 |
| Length (in) | 12.8 | 12.8 | 12.8 |
| Width (in) | 12.5 | 12.5 | 12.5 |
| After Baking | | | |
| Thickness (mm) | 9.5 | 12.5 | 11.3 |
| Thickness (mm) per 500 g | 8.2 | 10.8 | 11.0 |

TABLE 2-continued

|  | Sample A (Control) | Sample B (Active Dry Yeast) | Sample C (Encapsulated Yeast) |
| --- | --- | --- | --- |
| Length (in) | 11.0 | 11.0 | 11.0 |
| Width (in) | 10.8 | 10.8 | 11.0 |
| Pizza Weight (g) | 846.0 | 856.4 | 824.0 |

It was observed that samples B and C had a higher rising height than the control. When the rising height was corrected to a target weight of 500 g, the rising height for samples A, B, and C was 8.2 mm, 10.8 mm, and 11.0 mm, respectively.

It was concluded that the addition of active dry yeast (sample B) or encapsulated yeast (sample C) improved the rising height of the pizza.

Example 2

Pizza crusts were prepared from dough samples according to an embodiment and the rising of samples from freezer to oven was compared to control samples.

Dough formulations D, E, F, and G were prepared as in Example 1 ("Process I") with a 5000 g batch size according to formulations shown in TABLE 3. Formulation D (control) was prepared with cream yeast, formulation E with cream yeast and active dry yeast, formulation F with cream yeast and encapsulated yeast, and formulation G with additional cream yeast. Formulation G was used to compare the impact of simply adding more yeast to the dough.

TABLE 3

|  | Formulation D (Control) | | Formulation E (Active Dry Yeast) | | Formulation F (Encapsulated Yeast) | | Formulation G (Cream Yeast) | |
| --- | --- | --- | --- | --- | --- | --- | --- | --- |
|  | Wt-% | Grams | Wt-% | Grams | Wt-% | Grams | Wt-% | Grams |
| Hard Wheat Flour | 60.5 | 3024 | 60.5 | 3024 | 60.5 | 3024 | 60.5 | 3024 |
| Water | 29.2 | 1457 | 29.2 | 1457 | 29.2 | 1457 | 26.4 | 1322 |
| Salt | 1.4 | 71 | 1.4 | 71 | 1.4 | 71 | 1.4 | 71 |
| Sugar | 1.2 | 59 | 1.2 | 59 | 1.2 | 59 | 1.2 | 59 |
| Yeast Cream | 5.3 | 267 | 5.0 | 252 | 5.0 | 252 | 8.0 | 402 |
| Active dry Yeast | — | — | 0.30 | 15 | — | — | — | — |
| Encapsulated Yeast (85/15) | — | — | — | — | 0.36 | 18 | — | — |
| Total yeast solids | 0.96 | 48 | 1.2 | 59.6 | 1.2 | 59.9 | 1.4 | 72.3 |
| Shortening | 2.40 | 120.1 | 2.40 | 120.1 | 2.34 | 117.0 | 2.40 | 120.1 |
| Enzymes | 0.02 | 1.0 | 0.02 | 1.0 | 0.02 | 1.0 | 0.02 | 1.0 |
| TOTAL | 100 | 5000 | 100 | 5000 | 100 | 5000 | 100 | 5000 |

Samples D-1, E-1A, E-1B, F-1A, F-1B, and G-1 were prepared by sheeting formulations D, E, F, and G with a gap setting of 3.0 mm, resulting in a dough sheet having a thickness of about 6 mm, and cutting the sheeted dough into crusts. The crusts were proofed as in Example 1.

Additionally, sheeted crusts E-1B and F-1B prepared from formulations E and F were subjected Process II, where after proofing ("first proofing"), the crusts were compressed at 600 psi for 0.2 seconds and were proofed for another 10 min ("second proofing") at the same conditions as the first proofing. Samples D-1 and G-1, which contained cream yeast only, were not subjected to Process II.

The samples were frozen to −20° F. (−29° C.) and were stored frozen for two weeks. (The samples were not subject to freeze-thaw treatment.) The pizzas were baked at 400° F. (204° C.) for about 26 min until done with golden brown crust. After baking, the crust rising heights were recorded. Results are shown in TABLE 4.

TABLE 4

|  | Sample D-1 | Sample E-1 (Active Dry Yeast) | | Sample F-1 (Encapsulated Yeast) | | Sample G-1 |
| --- | --- | --- | --- | --- | --- | --- |
|  | (Control) | A | B | A | B | (Cream Yeast) |
| Process | I | I | II | I | II | I |
| *After Sheeting* | | | | | | |
| Weight (g) | 516.0 | 496.4 | 502.0 | 490.0 | 519.0 | 490.0 |
| Thickness (mm) | 6.4 | 5.9 | 6.0 | 6.0 | 5.8 | 6.8 |
| Length (in) | 12.0 | 12.0 | 12.0 | 12.0 | 11.8 | 12.0 |
| Width (in) | 11.8 | 11.8 | 11.5 | 11.8 | 11.5 | 11.5 |
| *After Proofing* | | | | | | |
| Thickness (mm) 1st Proof | 12.5 | 12.5 | 11.0 | 14.0 | 11.5 | 19.0 |
| Thickness (mm) 2nd Proof | N/A | N/A | 13.0 | N/A | 13.5 | N/A |
| Length (in) | 12.0 | 12.5 | 12.0 | 12.0 | 12.0 | 13.5 |
| Width (in) | 12.0 | 12.0 | 12.0 | 12.0 | 12.0 | 12.0 |
| *After Baking* | | | | | | |
| Weight (g) | 840.7 | 797.7 | 810.6 | 823.1 | 821.8 | 803.5 |
| Thickness (mm) | 16.5 | 18.0 | 20.0 | 19.0 | 22.0 | 18.5 |
| Thickness (mm) per 500 g | 16.0 | 18.1 | 19.9 | 19.4 | 21.2 | 18.9 |
| Length (in) | 11.5 | 11.5 | 11.5 | 11.5 | 11.0 | 12.0 |
| Width (in) | 11.5 | 11.3 | 11.5 | 11.5 | 11.0 | 11.5 |

It was observed that after the first proofing, samples D-1, E-1A, and F-1A had a thickness about twice the initial thickness after sheeting, whereas sample G-1 had a thickness about three times the initial thickness. After baking, samples E-1A and F-1A had a thickness that was greater than sample D-1 (control), and sample F-1A (encapsulated yeast) was also thicker than sample G-1 (cream yeast). It was concluded that the added rising of sample F was not due to merely additional yeast, but to the preservation of yeast through proofing and freezing.

It was further observed that pizza crust samples E-1B and F-1B prepared using Process II (compression and second proofing) rose even higher than crusts prepared using Process I, and had a thickness greater than either of samples D-1 or G-1. It was concluded that the active dry yeast and encapsulated yeast provided the dough with a preserved yeast component that enhanced the performance of the crusts.

Example 3

Pizza crusts were prepared from dough formulations according to an embodiment and the rising of samples from freezer to refrigerator to oven was compared to control samples.

Samples D-2, E-2, F-2, and G-2 were prepared according to formulations D, E, F, and G shown in TABLE 3 (Example 2). Samples E-2 and F-2 were prepared with both Process I (E-2A and F-2A) and Process II (E-2B and F-2B).

Cold storage: the samples were stored frozen at −20° F. (−29° C.) for two weeks and were then transferred to a walk-in cooler at 36° F. (2° C.) for one week.

After cold storage, the samples were baked in a conventional consumer oven at 400° F. (204° C.) for 20 min. The results are shown in TABLE 5.

TABLE 5

|  | Sample D-2 | Sample E-2 (Active Dry Yeast) | | Sample F-2 (Encapsulated Yeast) | | Sample G-2 |
| --- | --- | --- | --- | --- | --- | --- |
|  | (Control) | A | B | A | B | (Cream Yeast) |
| Process | I | I | II | I | II | I |
| *After Sheeting* | | | | | | |
| Weight (g) | 505.6 | 502.0 | 495.0 | 510.0 | 491.0 | 452.0 |
| Thickness (mm) | 6.1 | 6.1 | 6.0 | 6.0 | 6.1 | 6.1 |
| Length (in) | 12.0 | 12.0 | 12.0 | 12.0 | 11.8 | 12.0 |
| Width (in) | 11.8 | 11.8 | 11.5 | 11.8 | 11.8 | 11.3 |
| *After Proofing* | | | | | | |
| Thickness (mm) 1st Proof | 12.5 | 12.5 | 10.5 | 14.0 | 11.0 | 18.0 |
| Thickness (mm) 2nd Proof | N/A | N/A | 13.0 | N/A | 14.0 | N/A |
| Length (in) | 12.0 | 12.3 | 12.0 | 12.0 | 12.0 | 12.8 |
| Width (in) | 12.0 | 12.0 | 12.0 | 12.0 | 12.0 | 12.0 |
| *After Baking* | | | | | | |
| Weight (g) | 791.1 | 768.5 | 772.0 | 778.1 | 815.4 | 718.7 |
| Thickness (mm) | 23.0 | 24.0 | 24.5 | 25.0 | 27.3 | 19.5 |
| Thickness (mm) per 500 g | 22.7 | 23.9 | 24.7 | 24.5 | 27.8 | 21.6 |
| Length (in) | 12.0 | 11.8 | 11.3 | 12.5 | 11.8 | 12.0 |
| Width (in) | 11.5 | 11.3 | 11.0 | 11.8 | 11.5 | 11.3 |

It was observed that after baking, samples E-2A and F-2A had a thickness that was greater than sample D-2 (control) and sample G-2 (cream yeast). It was concluded that the added rising of samples E-2A and F-2A was not due to merely additional yeast, but to the preservation of yeast through proofing and freezing. Also, although sample G-2 (having additional cream yeast) rose the highest during proofing, it had the lowest thickness after baking, indicating that the high yeast content had a negative effect on the performance of the freezer-to-refrigerator-to-oven sample.

It was further observed that pizza crust samples E-2B and F-2B prepared using Process II (compression and second proofing) rose even higher than crusts prepared using Process I, and had a thickness greater than either of samples D-2 or G-2. It was concluded that the active dry yeast and encapsulated yeast provided the dough with preserved yeast component that enhanced the performance of the crusts during baking.

Example 4

Dough formulations were prepared according to an embodiment and the gassing power and gassing rate of the formulations were compared to a control sample.

Figure 5A:
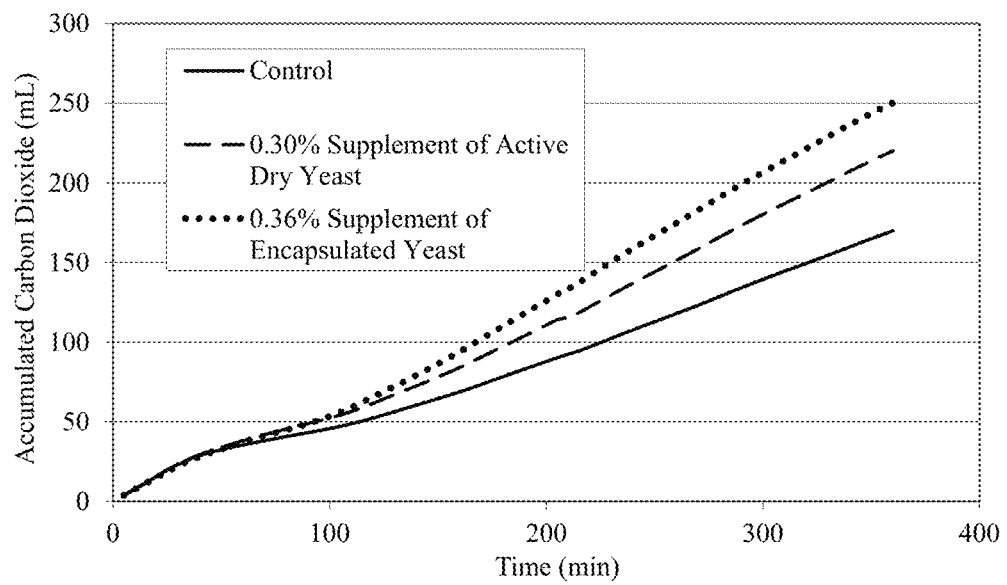
FIGS. 5A and 5B are graphical presentations of the results of a Risograph test of samples prepared in Example 4.
Figure 5B:
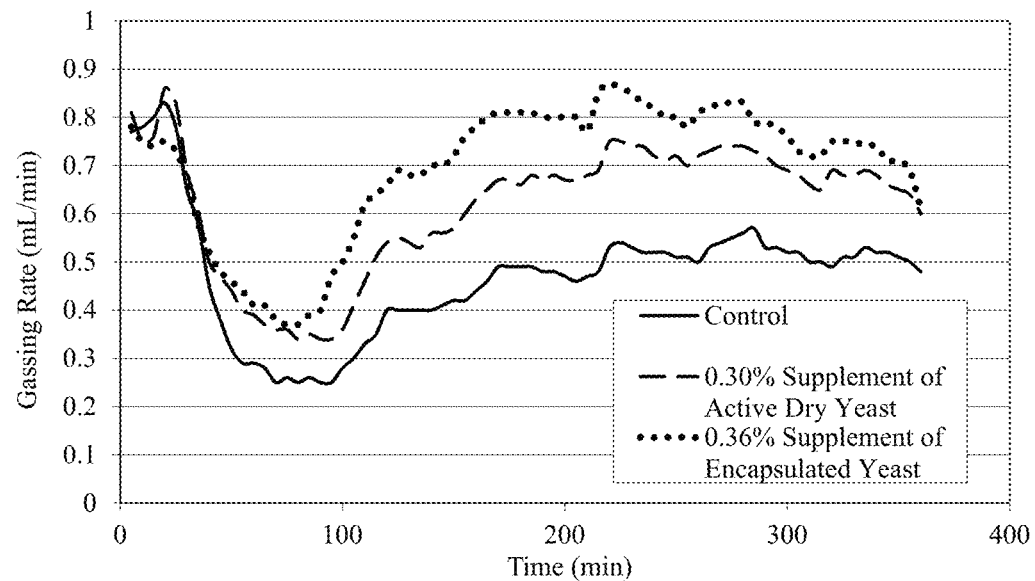

Dough formulations were prepared according to formulations A (control), B (active dry yeast), and C (encapsulated yeast) shown in TABLE 1 (Example 1). The formulations were proofed for 60 min at 90° F. (about 32° C.) and 70% relative humidity, and then stored frozen at −20° F. (−29° C.) for 6 weeks. After frozen storage, the samples were tested in a Risograph for $CO_2$ accumulation (gassing power) and rate of $CO_2$ production (gassing rate) as a function of time. Fifty grams of each sample was placed in the Risograph at 90° F.(about 32° C.). Results are shown graphically in FIGS. 5A and 5B.

It was observed that formulations B (active dry yeast) and C (encapsulated yeast) both exhibited higher gassing power and gassing rate than the control (formulation A), with formulation C outperforming formulation B.

It was concluded that the addition of active dry yeast and encapsulated yeast improved the gassing power and gassing rate of the dough formulations after frozen storage. Without wishing to be bound by theory, the improvement due to the active dry yeast is thought to be caused by a delay in the activation of the active dry yeast, which is added to the dough without pre-hydration.

Example 5

Dough formulations were prepared according to an embodiment and the gassing power and gassing rate of the formulations were evaluated.

Two dough formulations were prepared according to formulation C (encapsulated yeast) shown in TABLE 1 (Example 1). In the first formulation (sample C-3), encapsulated yeast was added as in Example 1, at the beginning of mixing by mixing the encapsulated yeast with the dry ingredients. In the second formulation (sample C-4), encapsulated yeast was added into the dough during the last minute of mixing.

Figure 6A:
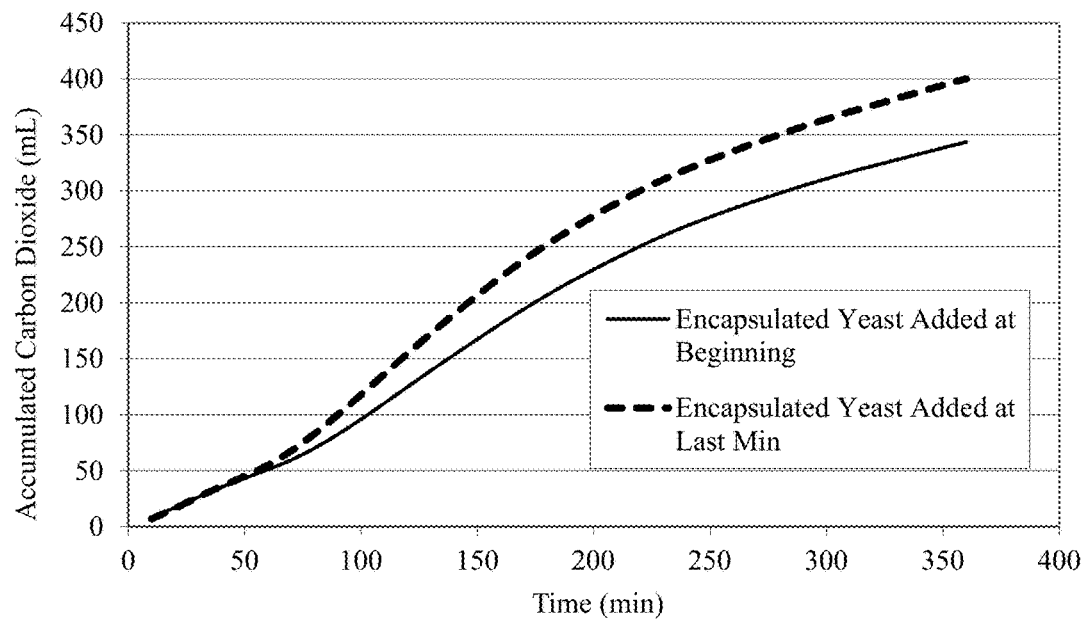
FIGS. 6A and 6B are graphical presentations of the results of a Risograph test of samples prepared in Example 5.
Figure 6B:
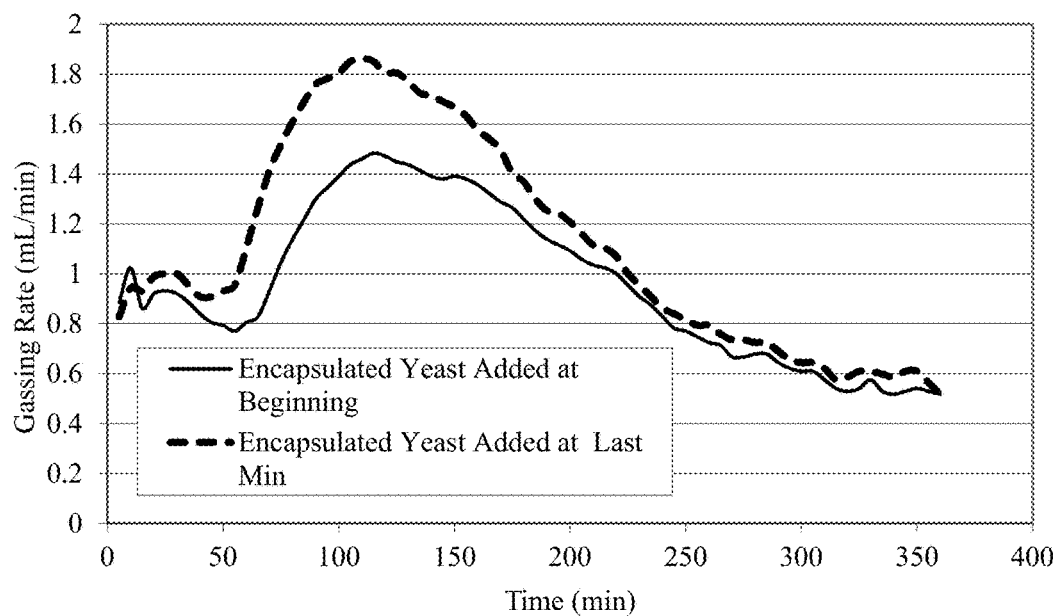

The formulations were proofed for 60 min at 90° F. (about 32° C.) and 70% relative humidity, were allowed to rest at room temperature for 5 min, and then stored frozen at −20° F. (−29° C.) for 7 days. After frozen storage, the samples were tested in a Risograph for $CO_2$ accumulation (gassing power) and rate of $CO_2$ production (gassing rate) as a function of time. Results are shown graphically in FIGS. 6A and 6B.

It was observed that sample C-4 (delayed addition) exhibited greater gassing power and higher gassing rate than sample C-3 (addition at the beginning). It was concluded that exposing the encapsulated yeast to a reduced amount of mixing helps further preserve the yeast through the preparation process.

Example 6

Dough formulations were prepared according to an embodiment and the gassing power and gassing rate of formulations after freeze-thaw treatment were compared to fresh formulations.

Sample preparation: dough formulations were prepared according to TABLE 6 using a stand mixer. Formulation H (control) was prepared with crumbled yeast, formulation J with crumbled yeast and encapsulated yeast, and formulation K with crumbled yeast and delayed addition encapsulated yeast.

The dry ingredients (flour, salt, sugar, dough conditioner and for formulation J, encapsulated yeast) were mixed together for 1 min at low speed (60 rpm). The wet ingredients (fat, ice water at 34° F. (1° C.), and crumbled yeast) were added, and the dough was mixed at low speed for 3 min and at high speed (110 rpm) for 7 min. Encapsulated yeast was added to formulation K at the last 1.5 minutes of the 7-min high speed mixing period.

TABLE 6

|  | Formulation H (Control) | | Formulation J (Encapsulated Yeast) | | Formulation K (Encapsulated, Delayed) | |
| --- | --- | --- | --- | --- | --- | --- |
|  | Wt-% | Lbs | Wt-% | Lbs | Wt-% | Lbs |
| Hard Wheat Flour | 59.98 | 50.00 | 59.97 | 50.00 | 59.97 | 50.00 |
| Water | 30.99 | 25.83 | 30.99 | 25.83 | 30.99 | 25.83 |
| Compressed Yeast | 3.68 | 3.07 | 3.20 | 2.67 | 3.20 | 2.67 |
| Encapsulated Yeast (90/10) | — | — | 0.48 | 0.40 | 0.48 | 0.40 |
| Dough enhancers | 0.32 | 0.27 | 0.32 | 0.27 | 0.32 | 0.27 |
| Sugar | 1.19 | 0.99 | 1.19 | 0.99 | 1.19 | 0.99 |
| Salt | 1.43 | 1.19 | 1.43 | 1.19 | 1.43 | 1.19 |
| Shortening | 2.40 | 96.06 | 2.40 | 96.06 | 2.36 | 94.40 |
| TOTAL | 100.00 | 83.37 | 100.00 | 83.37 | 100.00 | 83.37 |

Samples H-0, J-0, and K-0 (50 g each) of the freshly made formulations were set aside for Risograph testing.

Ten pounds of each formulation was sheeted to prepare pizza crusts having a center thickness of about 5 mm, a diameter of about 10.5 inches, and a weight of about 475 g. The crusts were proofed for 50 min at 95° F. (35° C.) and 70% relative humidity. After proofing, the crusts were allowed to rest at 65° F. (18° C.) for about 5 min while dimensions of the crusts were measured and recorded. The crusts were then blast frozen at −20° F. (−29° C.) and stored at −20° F. (−29° C.). Each of the frozen crusts were topped with 146 g of tomato sauce and 190 g of mozzarella cheese. The topped pizzas were stored frozen at −20° F. (−29° C.) and subjected to freeze-thaw treatment.

Freeze-thaw treatment: In one cycle of freeze-thaw treatment, the crusts were removed from frozen storage and stored at 39° F. (4° C.) for 4 hours per day, and then transferred back to −20° F. (−29° C.). The crusts were subjected to 21 cycles of freeze-thaw treatment.

At the conclusion of the freeze-thaw treatment, the samples were removed from the freezer and thawed at room temperature. When the frozen pizzas warmed to about 50° F. (10° C.), the sauce and cheese toppings became separated from the crust. The toppings were manually removed using a spoon. Samples H-1, J-1, and K-1 (50 g each) were cut from the crusts without distorting, damaging, or crumbing the crust, and were placed in the Risograph for analysis. Samples H-2, J-2, and K-2 were prepared from the remaining crusts (approximately 350 g each) by crumbling and mixing for about 2 min using a Farinograph with a temperature setting of 50° F. Fifty gram samples of H-2, J-2, and K-2 were placed in the Risograph for analysis.

Figure 7A:
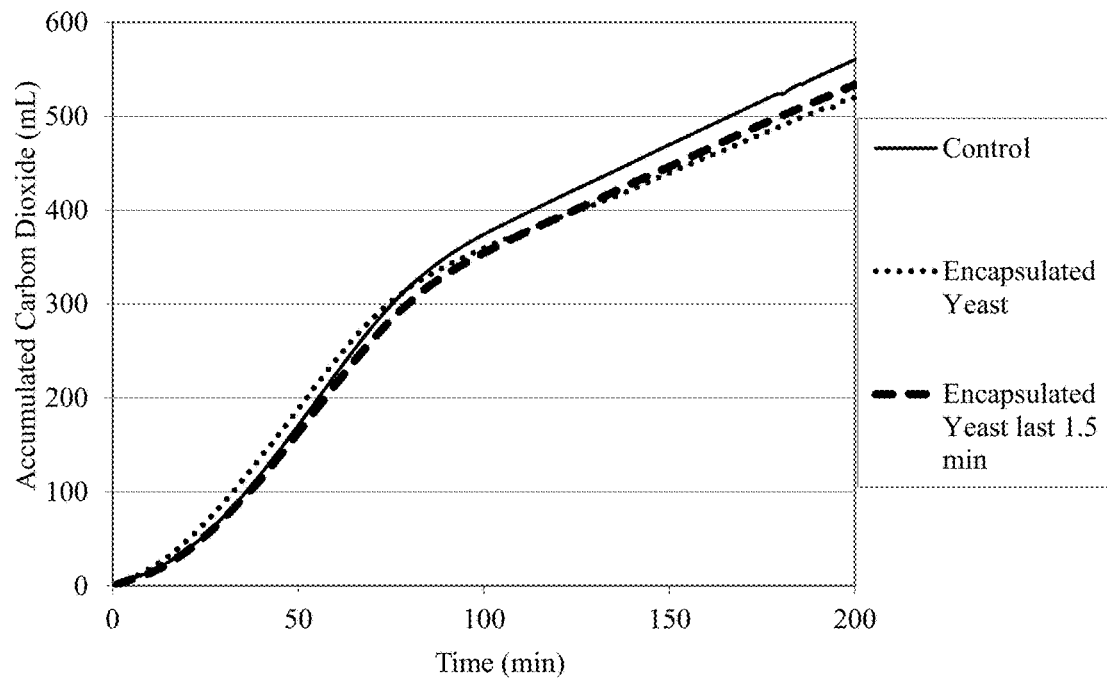
FIGS. 7A-7F are graphical presentations of the results of Risograph tests of samples prepared in Example 6.
Figure 7B:
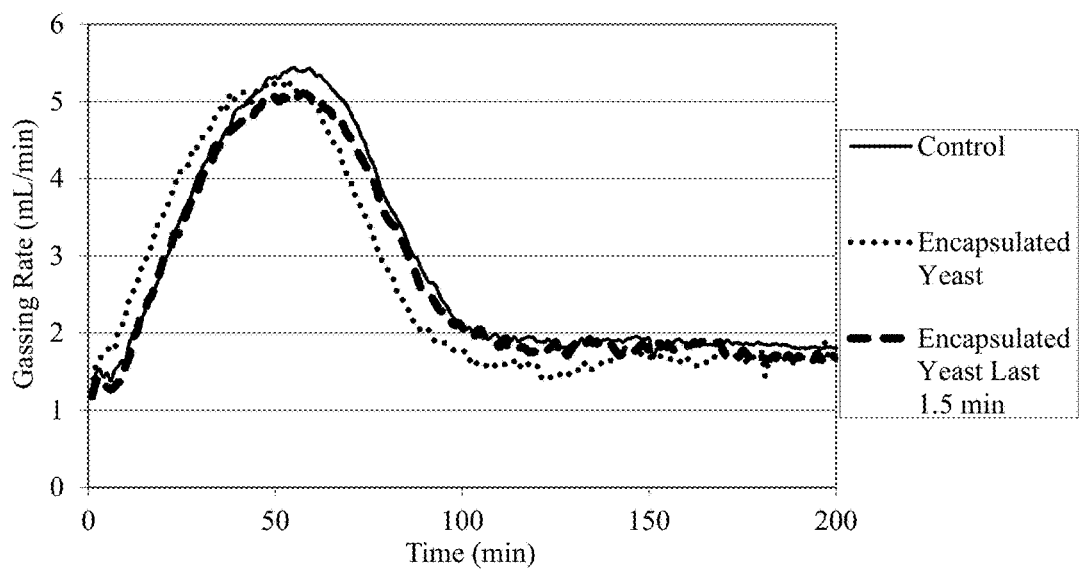
Figure 7C:
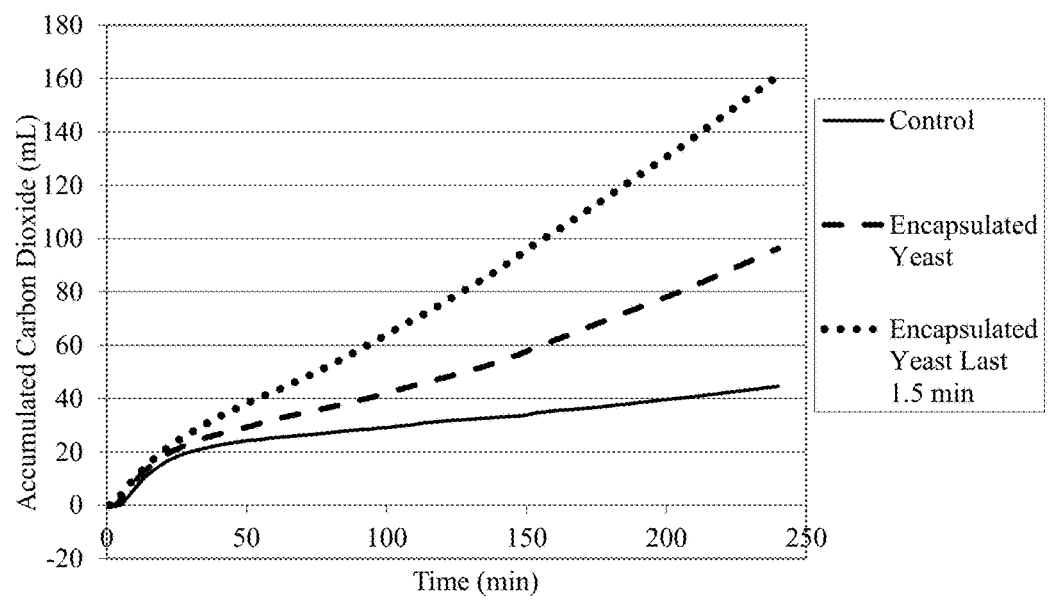
Figure 7D:
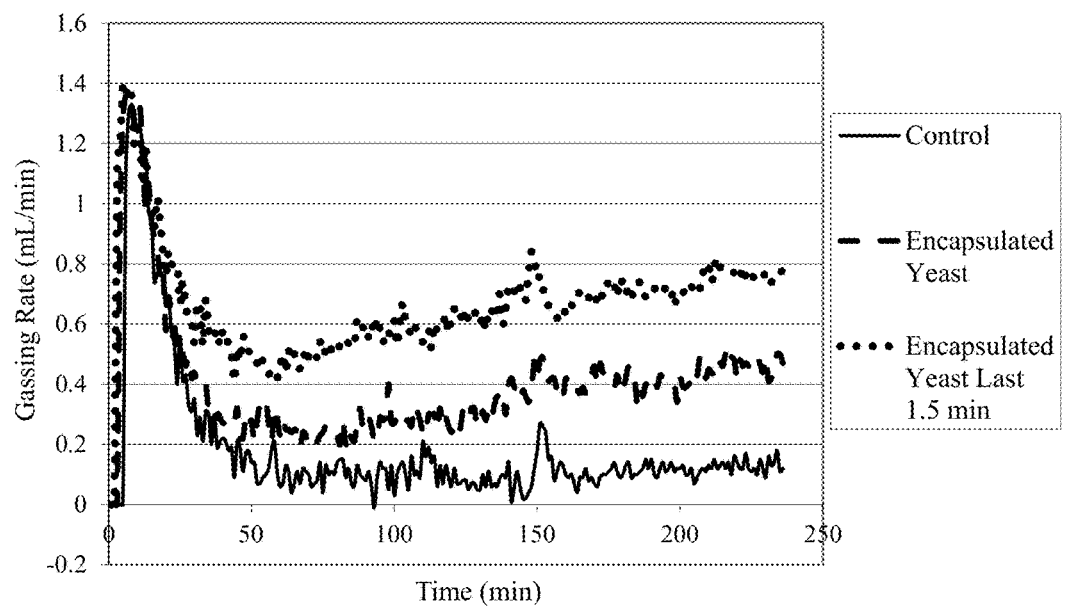
Figure 7E:
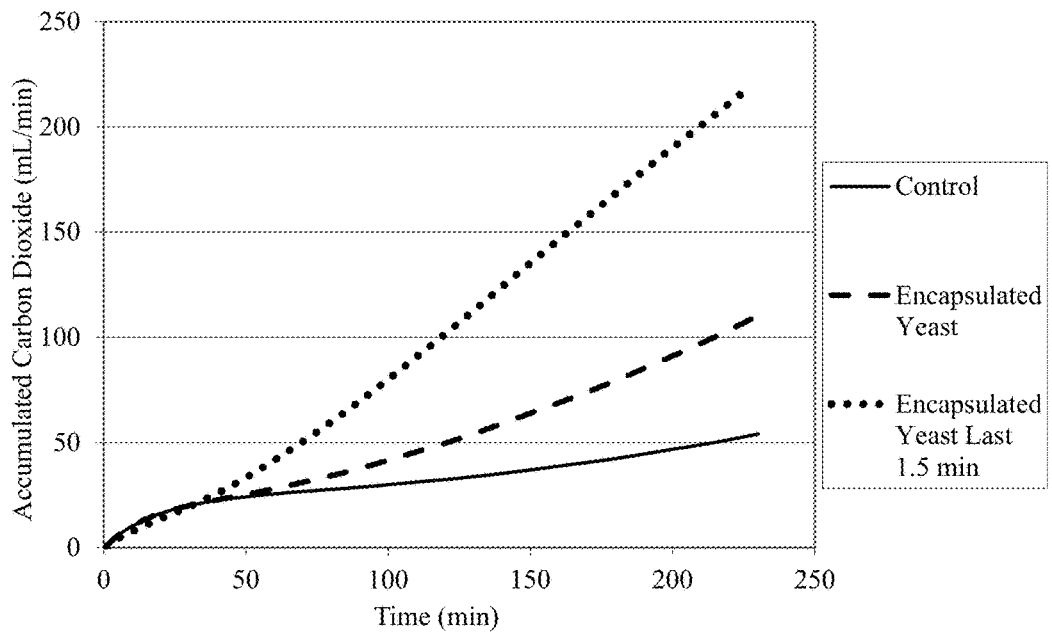
Figure 7F:
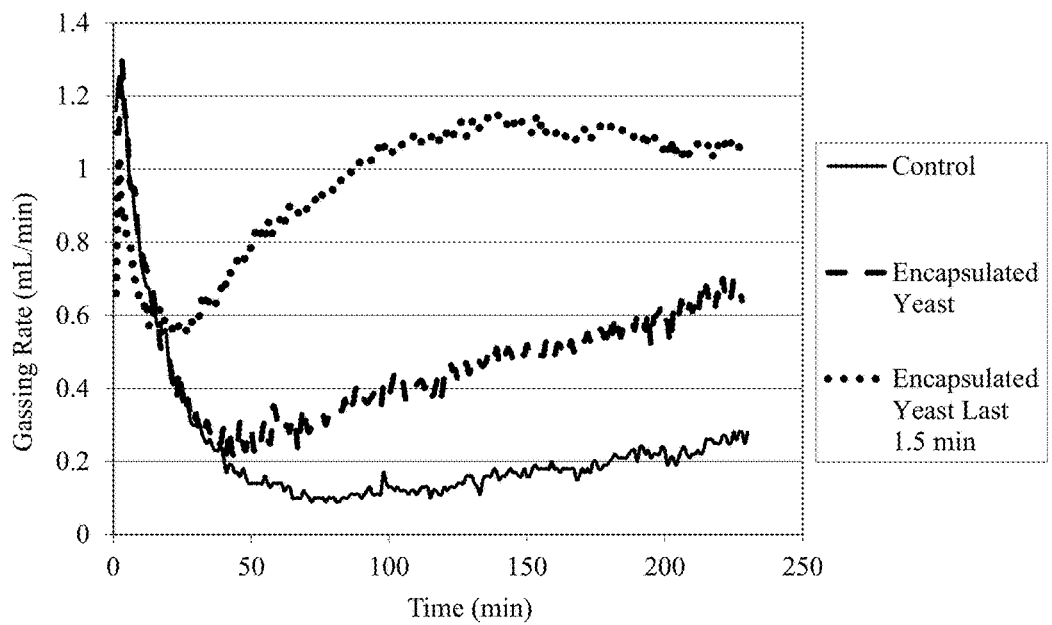

Results of the gassing power and gassing rate testing are shown in FIGS. 7A and 7B (freshly mixed samples H-0, J-0, and K-0 without freeze-thaw treatment), FIGS. 7C and 7D (samples H-1, J-1, and K-1, undisturbed samples after freeze-thaw treatment), and FIGS. 7E and 7F (samples H-2, J-2, and K-2, re-mixed samples after freeze-thaw treatment).

It was observed that samples H-0, J-0, and K-0 taken immediately after mixing and without freeze-thaw treatment exhibited very little difference in their gassing power or gassing rate. Control H-0 produced $CO_2$ at a slightly higher rate than samples J-0 and K-0, possibly due to the slightly higher amount of crumbled yeast in the dough. However, after proofing and subsequent freeze-thaw treatment, samples J-1 and K-1 performed significantly better than the control (H-1), having gassing rates that were approximately doubled and tripled, respectively, as compared to the control. The delayed-addition sample K-1 outperformed sample J-1, where encapsulated yeast was added at the beginning of mixing. The differences were even greater for remixed samples H-2, J-2, and K-2. The increase in gassing power after remixing was greater for K-2 (delayed addition) than J-2 (added at the beginning), indicating that the long mixing period at the beginning of the process caused a loss in the preservation of yeast.

It was concluded that encapsulated yeast provides the dough with a preserved yeast component that enhances the dough performance after freezing and multiple freeze-thaw cycles, and that yeast preservation can be further enhanced by mixing the encapsulated yeast into the dough toward the end of the mixing period. However, it was noted that mixing the encapsulated yeast into the dough at the beginning with other dry ingredients was more practical and convenient.

Example 7

Dough formulations were prepared according to an embodiment and the crust rising height of formulations after baking was evaluated.

Samples H-3 and J-3 were prepared according to formulations H and J shown in TABLE 6 (Example 6). Each of the samples were prepared into two pizza crusts as described in Example 6 that were subjected to 16 cycles (H-3A and J-3A) and 21 cycles (H-3B and J-3B) of freeze-thaw treatment. The pizzas were stored frozen at –20° F. (–29° C.) until baking.

Figure 8A:
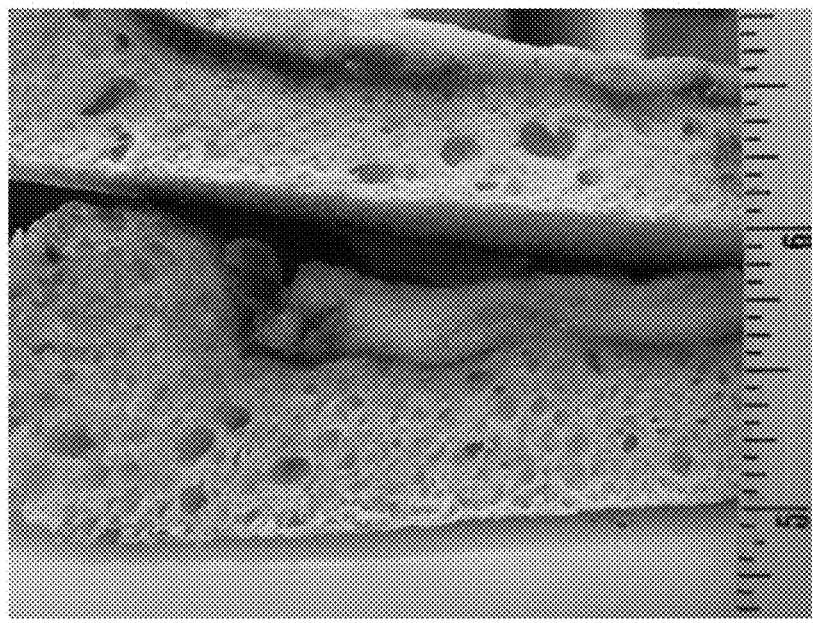
FIGS. 8A and 8B are images of cross cut samples prepared in Example 7.
Figure 8B:
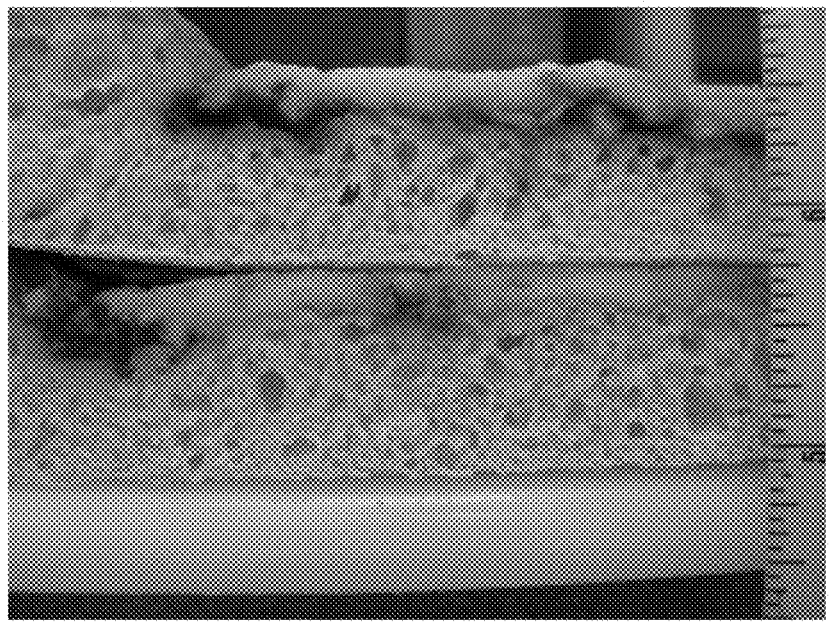

The pizza samples were tempered at 0° F. overnight prior to baking and baked at 400° F. (204° C.) for 22 min in a conventional oven. Images of cross sections of the baked pizzas are shown in FIGS. 8A (16 cycles of freeze-thaw treatment) and 8B (21 cycles of freeze-thaw treatment). In each image, the control sample (H-3A and H-3B) is on top and the sample with encapsulated yeast (J-3A and J-3B) is at the bottom.

It was observed that the crust height of sample H-3A (control, 16 cycles) was 14 mm, and sample J-3A (encapsulated yeast, 16 cycles) 16 mm. The crust height of sample H-3B (control, 21 cycles) was 16 mm, and sample J-3B (encapsulated yeast, 21 cycles) 18 mm. It was concluded that the encapsulated yeast provided the dough with a preserved yeast component that enhanced the crust performance during baking after 16 or 21 cycles of freeze-thaw treatment.

Example 8

Dough formulations were prepared according to an embodiment and the crust rising height of formulations after baking was evaluated.

Samples L-1, L-2, M-1 and M-2 were prepared according to formulations L and M shown in TABLE 7. The samples were prepared as described in Example 6, mixing encapsulated yeast (formulation M) in at the beginning. Dough temperature after mixing was 74° F. Dough balls of 10 lbs were sheeted to prepare crusts having a center thickness of about 5 mm, diameter of about 11 inches, and weight about 450 g.

TABLE 7

|  | Formulation L (Control) | | Formulation M (Encapsulated Yeast) | |
| --- | --- | --- | --- | --- |
|  | Wt-% | Lbs | Wt-% | Lbs |
| Hard Wheat Flour | 60.01 | 50.00 | 59.97 | 50.00 |
| Water | 31.01 | 25.83 | 30.99 | 25.83 |
| Compressed Yeast | 3.62 | 3.02 | 3.20 | 2.67 |
| Encapsulated Yeast (80/20) | — | — | 0.48 | 0.40 |
| Dough Enhancers | 0.32 | 0.27 | 0.32 | 0.27 |
| Sugar | 1.19 | 0.99 | 1.19 | 0.99 |
| Salt | 1.43 | 1.19 | 1.43 | 1.19 |
| Shortening | 2.41 | 2.01 | 2.41 | 2.01 |
| TOTAL | 100.00 | 83.32 | 100.00 | 83.37 |

The crusts were proofed for 50 min at 95° F. (about 35° C.) and 70% relative humidity. The crusts were blast frozen and stored frozen at –20° F. (–29° C.) overnight. The frozen crusts were topped with 170 g of tomato sauce and 220 g mozzarella cheese and further stored frozen at –20° F. (–29° C.) until use.

Samples L-1 and M-1 were stored frozen for 2 weeks and then transferred to 39° F. (4° C.) for 18 h prior to baking. The samples were baked in a conventional oven at 400° F. (204° C.) for 18 min.

Samples L-2 and M-2 were stored frozen for 10 weeks and then transferred to 39° F. (4° C.) for 4 days to simulate a product at a grocery store deli. The samples were baked in a conventional oven at 400° F. (204° C.) for 18 min.

Figure 9A:
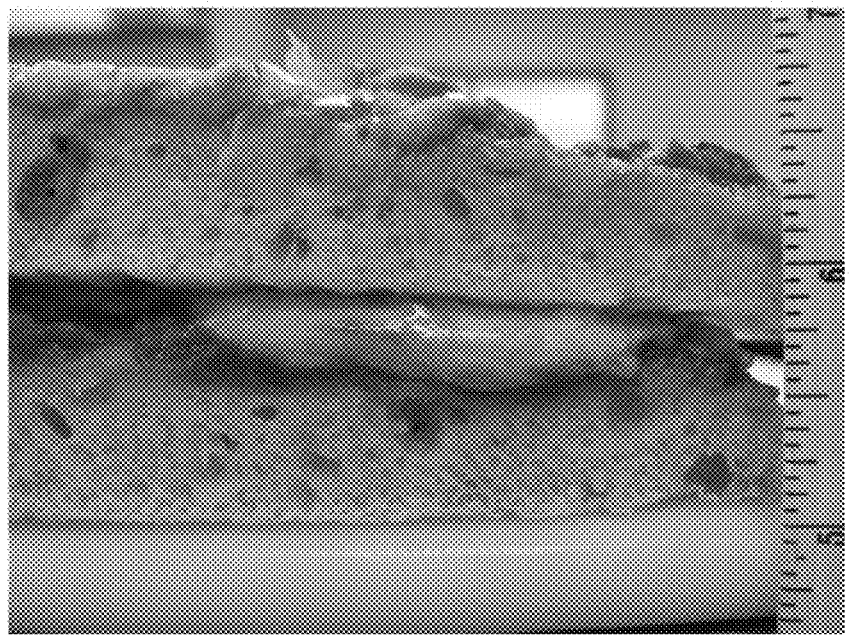
FIGS. 9A-9C are images of cross cut samples prepared in Example 8.
Figure 9B:
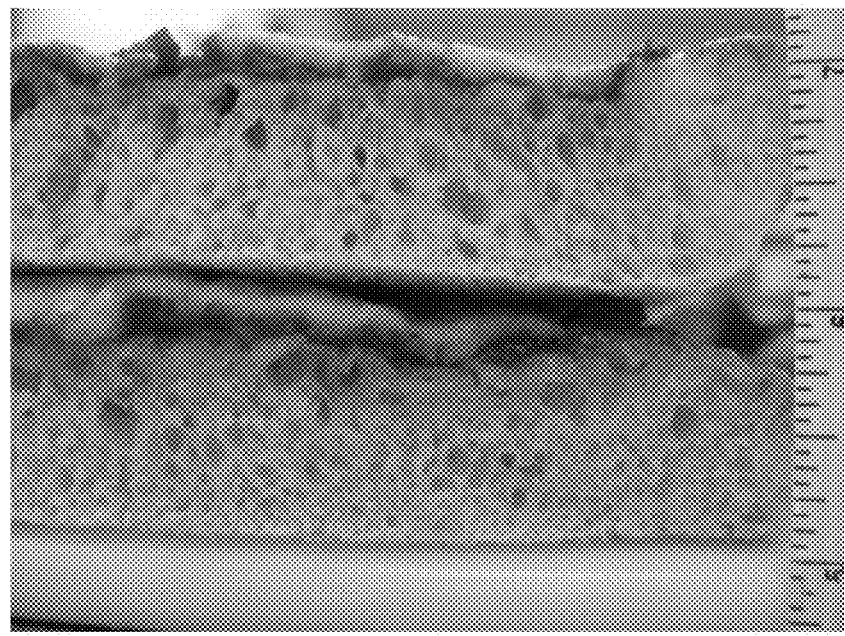
Figure 9C:
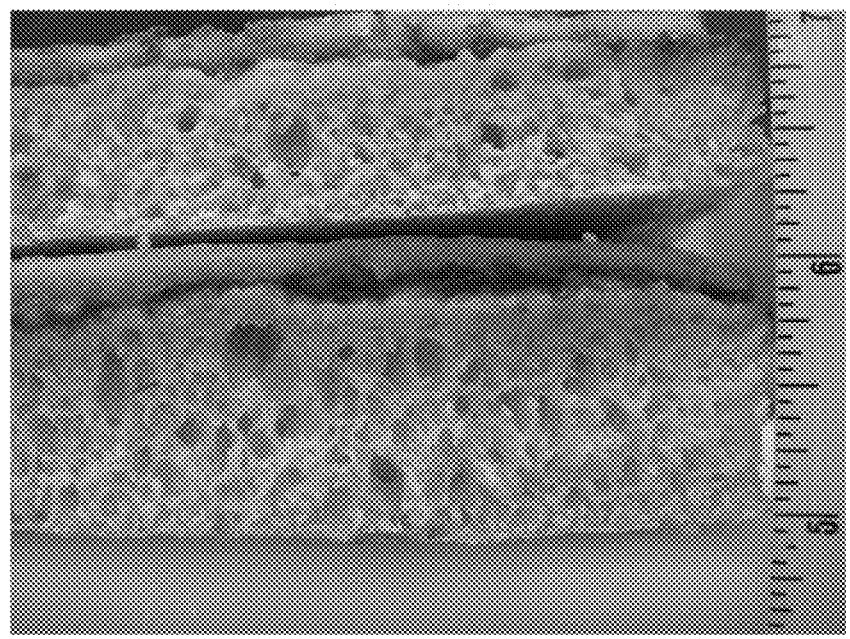

The samples were cut to evaluate the height and texture of the cross section. Images of the samples are shown in FIGS. 9A, 9B and 9C. FIG. 9A shows sample L-1, FIG. 9B sample M-1, and FIG. 9C sample L-2 at the top and sample M-2 at the bottom.

It was observed that samples L-1 (control) and M-1, subject to 2 weeks of frozen storage and 18 h thaw period, had a height of 16 mm and 20 mm, respectively. Samples L-2 (control) and M-2, subject to 10 weeks of frozen storage and 4 days of refrigeration, had a height of 17 mm and 23 mm, respectively. It was further observed that samples M-1 and M-2 had a more open texture with more gas bubbles than samples L-1 and L-2 (controls).

It was concluded that the encapsulated yeast provided the crusts with a preserved yeast component that enhanced the rising and texture of the crust. The rising capacity of the crust with encapsulated yeast also increased more after the longer refrigeration period.

Example 9

Dough formulations were prepared according to an embodiment and crust rising height and crust cell opening structure of formulations after baking was evaluated.

Samples were prepared according to formulations N (control), P (control high yeast), and Q (encapsulated yeast) shown in TABLE 8. Formulations P and Q had the same total yeast content on a yeast dry weight basis. The samples were prepared according to Process II (including compression step) described in Example 2. The encapsulated yeast in formulation Q was added with the dry ingredients and mixed in the dough at the beginning.

TABLE 8

|  | Formulation N (Control) | | Formulation P (Control High) | | Formulation Q (Encapsulated Yeast) | |
| --- | --- | --- | --- | --- | --- | --- |
|  | Wt-% | Grams | Wt-% | Grams | Wt-% | Grams |
| Hard Wheat Flour | 60.56 | 3000.00 | 60.37 | 3000.00 | 60.38 | 3000.00 |
| Water | 31.34 | 1552.50 | 30.87 | 1534.17 | 31.25 | 1552.50 |
| Salt | 1.43 | 70.70 | 1.42 | 70.70 | 1.42 | 70.70 |
| Sugar | 1.21 | 60.00 | 1.21 | 60.00 | 1.21 | 60.00 |
| Compressed Yeast | 3.14 | 155.40 | 3.82 | 189.85 | 3.13 | 155.40 |
| Encapsulated Yeast (80/20) | — | — | — | — | 0.30 | 15.00 |
| Shortening | 2.30 | 113.98 | 2.29 | 113.98 | 2.29 | 113.98 |
| Enzymes | 0.020 | 0.99 | 0.020 | 0.99 | 0.020 | 0.99 |
| TOTAL | 100.00 | 4953.57 | 100.00 | 4969.77 | 100.00 | 4968.57 |

The samples were sheeted to prepare pizza crusts having a center thickness of about 5 mm, a diameter of about 11.75 inches, and a weight of about 400 g. The crusts were proofed for 50 min at 95° F. (about 35° C.) and 70% relative humidity. After proofing, the crusts had a thickness of about 12 mm and a diameter of 12 inches. The crusts were blast frozen at −20° F. (−29° C.) and stored at −20° F. (−29° C.). Each of the frozen crusts was topped with 170 g of tomato sauce and 220 g of mozzarella cheese. The topped pizzas were stored frozen at −20° F. (−29° C.) for one week.

Figure 10:
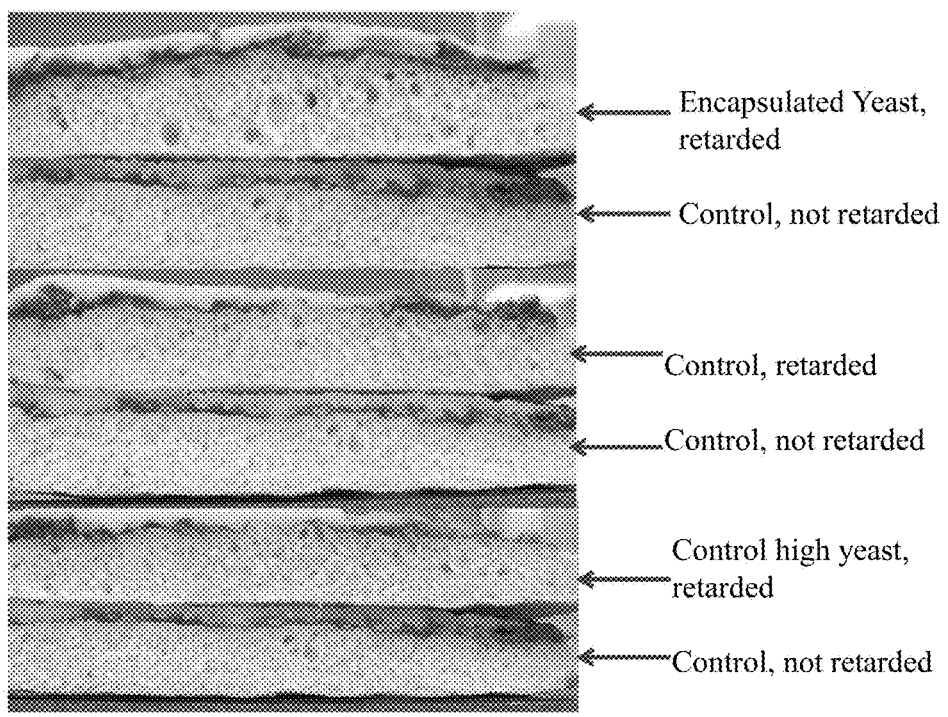
FIG. 10 is an image of cross cut samples prepared in Example 9.

The frozen pizzas were transferred from frozen storage to 38° F. (3° C.) for 24 h for a retardation step. At the end of 24 h at 38° F. (3° C.), the pizzas were transferred back to frozen storage at −20° F. (−29° C.). After one week, the pizzas were baked at 400° F. (204° C.) for 22 min. One control crust (formulation N) was also baked without the retardation step. The baked pizzas were cut to evaluate texture and crust height. Images of cross sections of the baked pizzas are shown in FIG. 10.

It was observed that sample Q (encapsulated yeast) rose higher and had a more uneven cell structure with openings of varying sizes as compared to samples N (control) and P (control high yeast), which exhibited a denser and more even cell structure.

Example 10

Dough formulations were prepared according to an embodiment and crust rising height and crust cell opening structure of formulations after baking was evaluated.

Samples were prepared according to formulations R (control), S (encapsulated yeast), T (instant yeast), and U (semi-dry yeast) shown in TABLE 9. The samples were prepared according to Process II (including compression step) described in Example 2. The encapsulated yeast in formulation S was added with the dry ingredients and mixed in the dough at the beginning. The instant yeast, and the semi-dry yeast were added in the last 1.5 min of the 7 min high mixing, so that the yeasts were folded-in into the dough and remained intact and non-hydrated in dough when the mixing was completed. The yeast granules were visible and dispersed throughout the dough.

TABLE 9

|  | Formulation R (Control) | | Formulation S (Encapsulated Yeast) | | Formulation T (Instant Yeast) | | Formulation U (Semi-dry Yeast) | |
| --- | --- | --- | --- | --- | --- | --- | --- | --- |
|  | Wt-% | Lbs | Wt-% | Lbs | Wt-% | Lbs | Wt-% | Lbs |
| Hard Wheat Flour | 59.49 | 50.0 | 59.46 | 50 | 59.46 | 50.00 | 59.46 | 50.00 |
| Water | 30.74 | 25.8 | 30.72 | 25.83 | 30.72 | 25.83 | 30.72 | 25.83 |
| Compressed Yeast | 3.59 | 3.02 | 3.17 | 2.67 | 3.17 | 2.67 | 3.17 | 2.67 |
| Encapsulated Yeast (90/10) |  |  | 0.48 | 0.40 |  |  |  |  |
| Fold-in Non-hydrated Instant Yeast |  |  |  |  | 0.48 | 0.40 |  |  |
| Fold-in Non-hydrated Semi-dry Yeast |  |  |  |  |  |  | 0.48 | 0.40 |
| Dough Enhancers | 1.31 | 1.10 | 1.31 | 1.10 | 1.31 | 1.10 | 1.31 | 1.10 |
| Sugar | 1.19 | 1.00 | 1.19 | 1.00 | 1.19 | 1.00 | 1.19 | 1.00 |
| Salt | 1.19 | 1.00 | 1.19 | 1.00 | 1.19 | 1.00 | 1.19 | 1.00 |
| Shortening | 2.50 | 2.10 | 2.50 | 2.10 | 2.50 | 2.10 | 2.50 | 2.10 |
| TOTAL | 100.00 | 84.05 | 100.00 | 84.10 | 100.00 | 84.10 | 100.00 | 84.10 |

The samples were sheeted to prepare pizza crusts having a center thickness of about 5 mm, a diameter of about 11.75 inches, and a weight of about 400 g. The crusts were proofed for 50 min at 95° F. (35° C.) and 70% relative humidity. After proofing, the crusts had a thickness of about 12 mm and a diameter of 12 inches. The crusts were blast frozen at −20° F. (−29° C.) and stored at −20° F. (−29° C.). Each of the frozen crusts was topped with 150 g of tomato sauce and 210 g of mozzarella cheese. The topped pizzas were stored frozen at −20° F. (−29° C.) until use.

After three weeks of frozen storage, samples were baked in a conventional oven for 22 min and the rising height and texture were evaluated. It was observed that samples R-1 (control), S-1 (encapsulated yeast), T-1 (instant yeast) and U-1 (semi-dry yeast), had a rising height of 16.0 mm, 17.0, 16.5, and 19.5 mm, respectively. It was further observed that samples S, T, and U had a slightly opener texture with larger gas bubbles than sample R-1 (control).

After four weeks of frozen storage, the same products were then transferred to 39° F. (4° C.) for 18 h prior to baking. The samples were baked in a conventional oven at 400° F. (204° C.) for 18 min.

Figure 11:
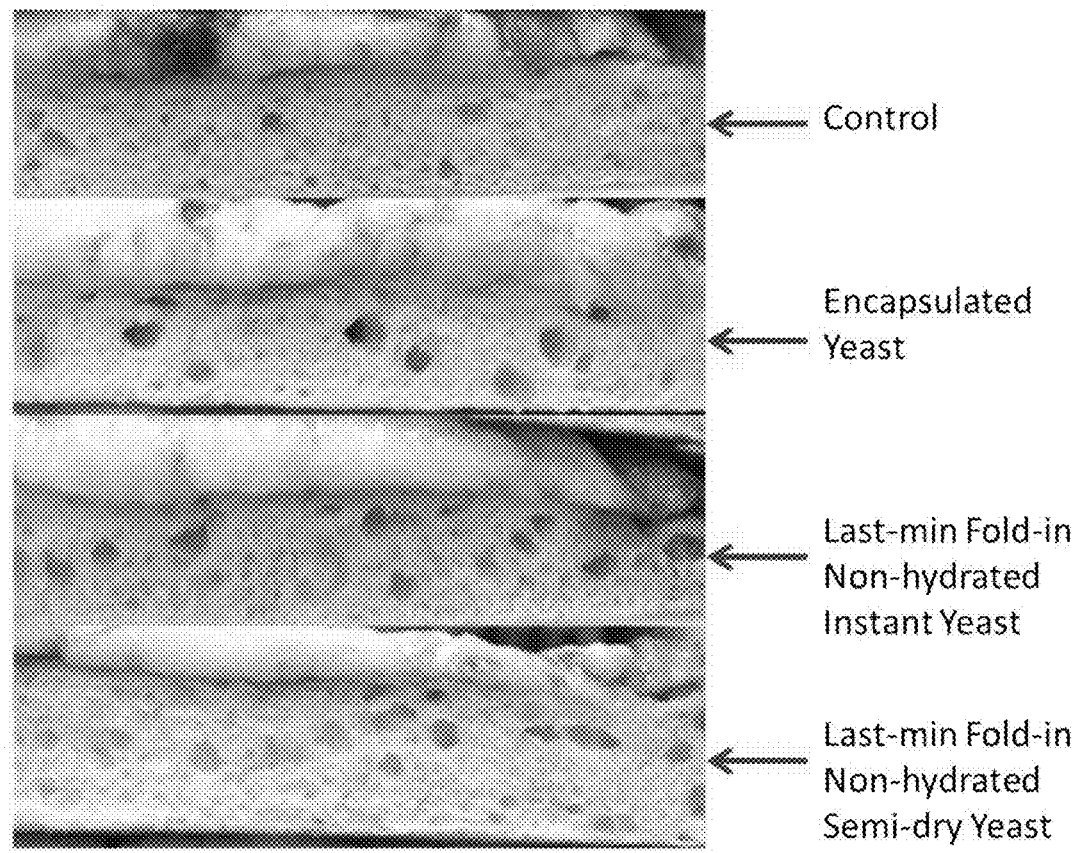
FIG. 11 is an image of cross cut samples prepared in Example 10.

The samples were cut to evaluate the height and texture of the cross section. Images of the samples are shown in FIG. 11.

It was observed that samples R-2 (control), S-2 (encapsulated yeast), T-2 (instant yeast) and U-2 (semi-dry yeast), subject to 4 weeks of frozen storage and 18 h thaw period, had a height of 16.3 mm, 17.2, 18.7, and 20.2 mm, respectively. It was further observed that samples S-2, T-2, and U-2 had a more open texture with more uneven and larger gas bubbles than samples R-2 (control). Additionally, sample S-2 (encapsulated yeast) had the largest gas bubbles (4-8 mm diameter), followed by sample T-2 (instant yeast) (3-6 mm diameter), and sample U-2 (semi-dry yeast) (2-4 mm diameter). Control had the smallest gas bubbles (1-3 mm diameter). Uneven and larger cells openings are typically preferred in rising crust pizza and flatbread dough.

It was concluded that the encapsulated yeast, folded-in non-hydrated instant yeast, and folded-in non-hydrated semi-dry yeast provided the crusts with a preserved yeast component that enhanced the rising and texture of the crust.

Example 11

Dough samples were prepared according to an embodiment to evaluate the yeast delay and preservation capability of fat coated yeast.

Figure 12A:
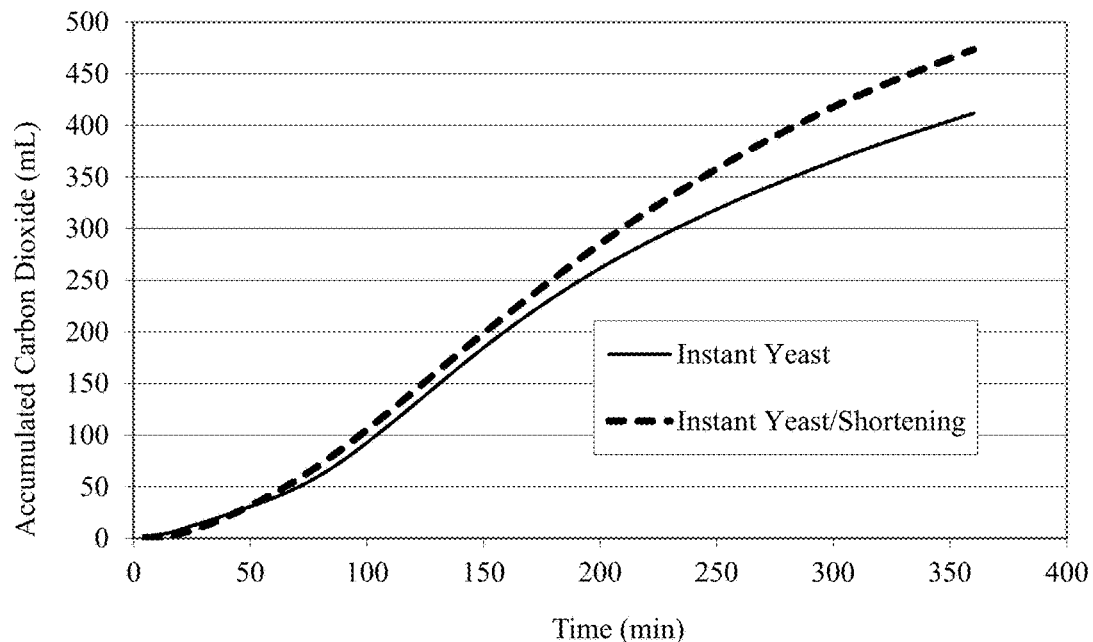
FIGS. 12A and 12B are graphical presentations of the results of a Risograph test of samples prepared in Example 11.
Figure 12B:
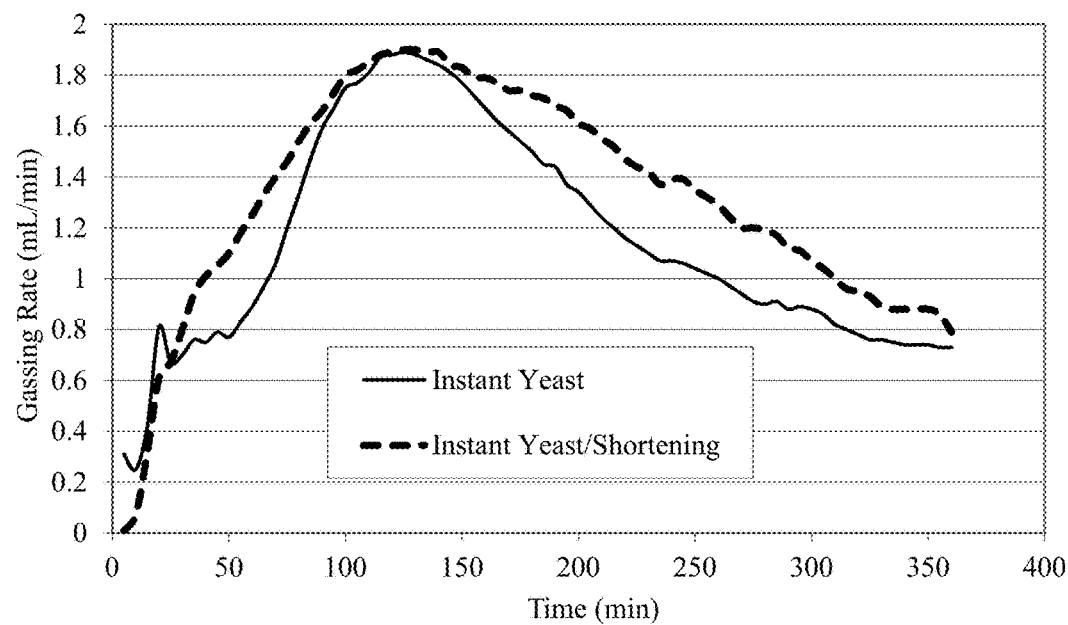

An instant yeast was coated with a small amount of shortening and mixed in the dough at 0.3 wt-% by weight during the last minute of dough mixing. A control sample was prepared using 0.3 wt-% instant yeast and shortening mixed in separately at the beginning of dough mixing. The samples were prepared according to formulation A in TABLE 1 (Example 1) with the added 0.3 wt-% instant yeast. The samples were proofed for 60 min at 90° F. (about 32° C.) and 70% relative humidity. After proofing, the samples were allowed to rest at room temperature for 5 min. The samples were frozen at −20° F. (−29° C.) and stored frozen for 7 days. After frozen storage, the samples were placed in the Risograph for evaluation of gassing power and gassing rate. Results are shown in FIGS. 12A and 12B.

It was observed that the sample with fat coated instant yeast added at the last minute of mixing had a higher gassing power and gassing rate than the sample with instant yeast added at the beginning of mixing.

Example 12

The melting characteristics of various lipid coatings for yeast were evaluated.

The encapsulated and fat coated yeasts used in the Examples included four different coating materials: vegetable oil; monoglyceride; mixture of mono- and diglycerides; and palm-oil based shortening. The temperature behavior of the lipids was compared to a protected active dry yeast.

Figure 13:
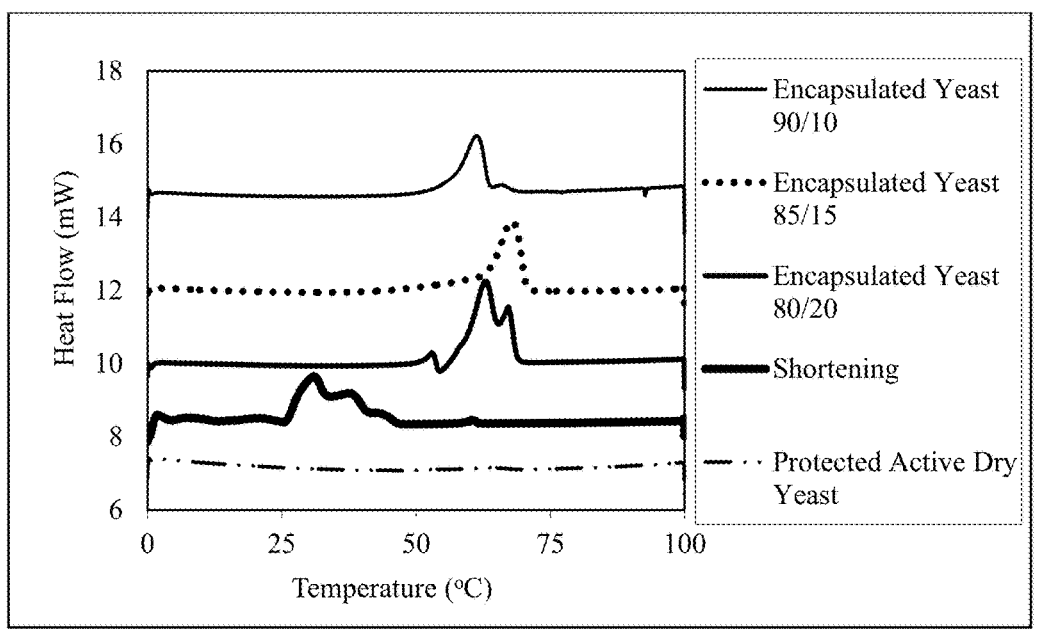
FIG. 13 is a graphical presentation of test results related to thermal behavior of lipid coatings according to Example 12.
Figure 14A:
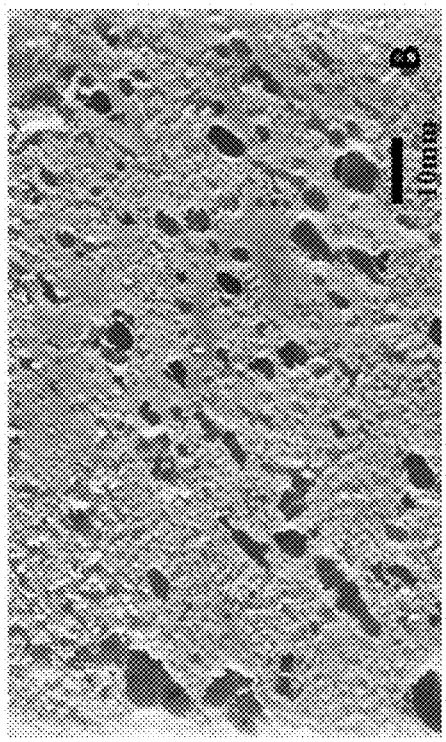
FIGS. 14A-14D are images of cross cut samples prepared for C-cell analysis according to Example 13.
Figure 14B:
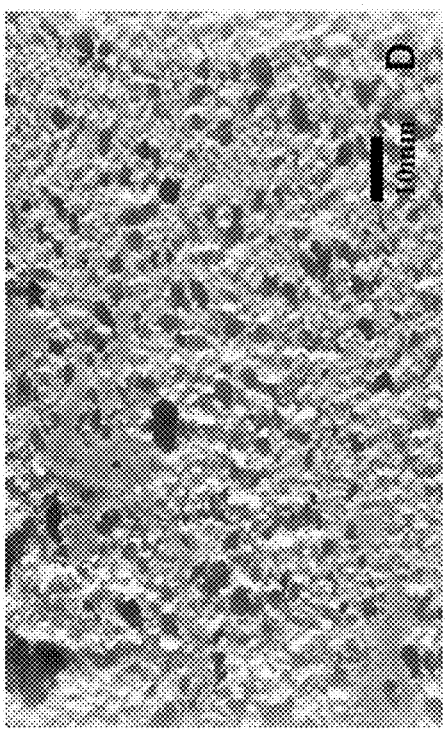
Figure 14C:
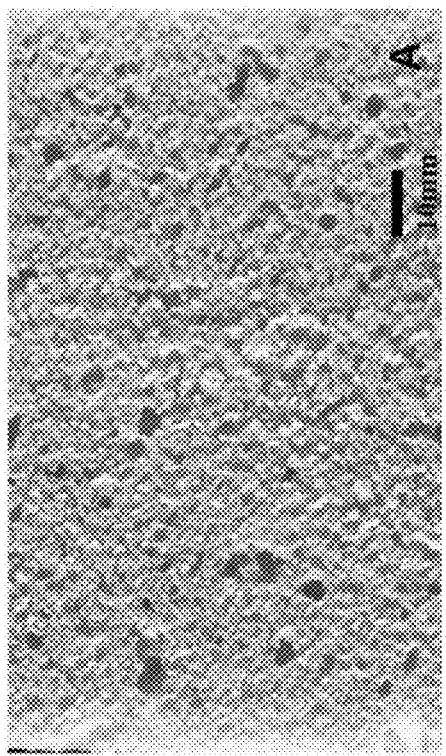
Figure 14D:
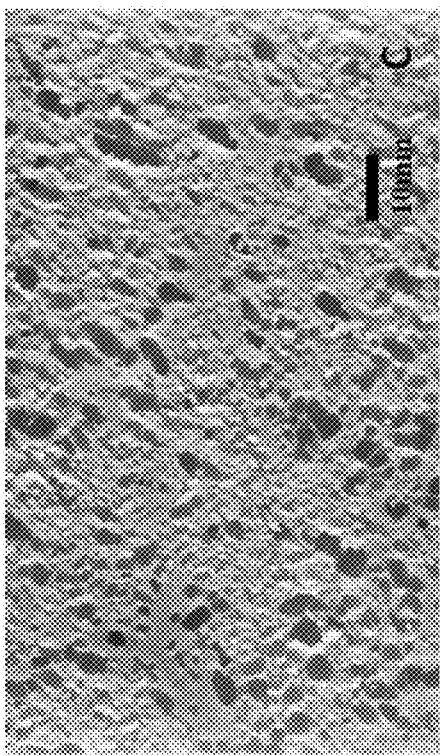

The determinations were done using a differential scanning calorimeter ("DSC") equipped with PYRIS Software V 4.1 (available from Perkin Elmer Instrumentations LLC in Waltham, Mass.). The results are shown in TABLE 10 with corresponding thermograms shown in FIG. 13.

TABLE 10

| Material | Peak Temp ° C. | Onset Temp ° C. | End Temp ° C. | Enthalpy (ΔH, J/g) |
|---|---|---|---|---|
| Vegetable oil (Encapsulated Yeast 90/10, 7.52 mg) | 61.43 | 56.79 | 63.78 | 141.80 (14.18) |
| Monoglyceride (Encapsulated Yeast 85/15, 5.01 mg) | 67.88 | 62.80 | 70.47 | 201.87 (30.28) |
| Mono- and diglyceride (Encapsulated Yeast 80/20, 6.41 mg) | Multiple: 63.08, 68.0 | 50.78 | 68.93 | 200.00 (39.99) |
| Shortening, 4.57 mg | Multiple: 30.93, 37.20, 43.25 | 26.02 | 34.87 | 34.05 |
| Protected Active Dry Yeast, 6.55 mg | 64.09 | 51.00 | 67.10 | 0.96 |

It was observed that vegetable oil used in the 90/10 coating and monoglyceride had a single peak (61.43° C. and 67.88° C., respectively), indicating a rather simple crystal structure of the molecular arrangement, whereas shortening exhibited a broad peak in the range of 20 to 50° C., indicating polymorphism with multiple crystals. The Protected Active Dry yeast was not coated and therefore did not display a peak for phase transition.

The spreadability of shortening makes the fat suitable for use in coating the yeast in laboratory, pilot, and manufacturing operations. A mechanical mixer can be used to coat the yeast by mixing the yeast and fat together before adding into the dough. On the other hand, the simple melting profile of the monoglyceride makes it suitable for use in a controlled encapsulation facility, where typically molten fat is spread in the head space of a fluid bed carrying the yeast.

Example 13

Samples prepared according to embodiments of the present disclosure and a control sample were analyzed using C-cell analysis. C-cell analysis can be used to quantify the open cell structure in a product by measuring cell size distribution in the product. Cell size non-uniformity (or unevenness) is defined as a measure of the lack of uniformity between fine and course texture (including holes) across a slice of dough or bread. While the slice could be vertical or horizontal, more reliable measurements of cell size non-uniformity are obtained by measuring horizontal slices. C-cell analysis can be performed using the C-Cell Imaging System manufactured by Calibre Control International, Ltd. in Warrington, UK.

Figure 15:
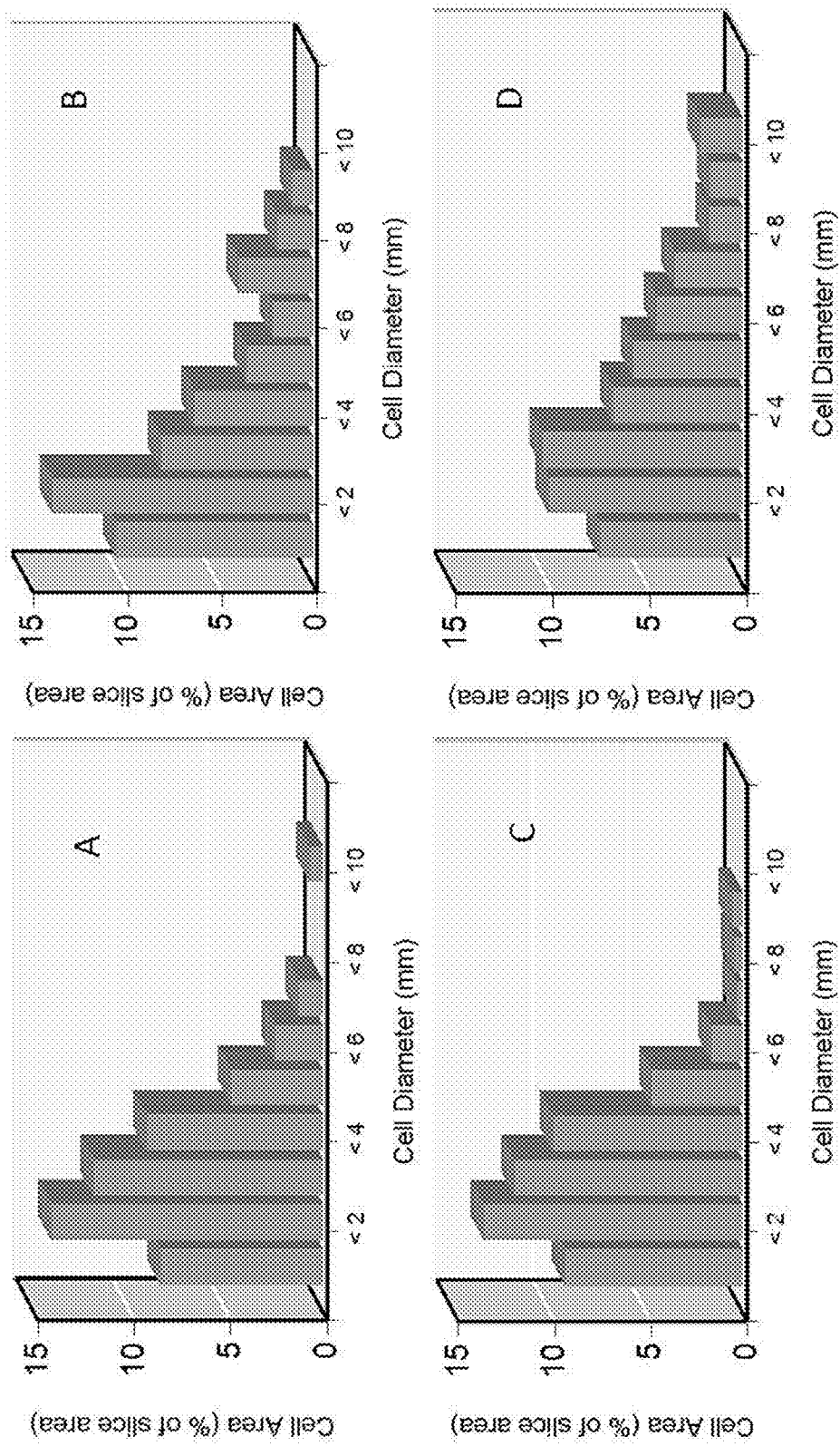
FIG. 15 is a graphical presentation of C-cell analysis test results of the samples of FIGS. 14A-14D.

The control (sample A) was prepared as described in Example 10 and corresponds to sample R-2. Three test samples, sample B, sample C, and sample D, were prepared as described in Example 10 (samples B, C, and D correspond to samples S-2, T-2, and U-2, respectively). Sample B was prepared with encapsulated yeast as the preserved yeast component, sample C was prepared with instant yeast as the preserved yeast component, and sample D was prepared with semi-dry yeast as the preserved yeast component. After baking, a horizontally cut slice of each of the samples was analyzed using the C-Cell Imaging System. Images of the cut slices are shown in FIGS. 14A-14D. Results of the analysis are shown graphically in FIG. 15 as compound cell area (% of slice area) as a function of cell diameter (mm).

It was observed that the control (sample A) had evenly sized and shaped cell openings with diameters ranging mainly from 1 to 4 mm. Each of samples B, C, and D had cell openings that were larger and more uneven than the control. Sample B had uneven cell openings with major diameters ranging from 1 to 4 mm and 6 to 8 mm. Sample C had uneven cell openings with major diameter ranging from 1 to 5 mm. Sample D had uneven cell openings with major diameter ranging from 1 to 10 mm.

It was concluded that the composition and method of the present disclosure result in a baked crust that has larger and more uneven open cells, both of which are desired qualities in baked, yeast leavened goods.

While certain embodiments of the invention have been described, other embodiments may exist. While the specification includes a detailed description, the invention's scope is indicated by the following claims. The specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A proofed frozen dough comprising:
    (a) a dough mixture of flour, water, and optionally additives, the dough mixture defining a dough matrix;
    (b) gas bubbles dispersed throughout the dough matrix;
    (c) a spent yeast component; and
    (d) a preserved yeast component comprising a fat-coated yeast, a non-hydrated yeast or a combination thereof.

2. The proofed frozen dough of claim 1, wherein the proofed frozen dough comprises about 1 to about 8 wt. % of the spent yeast component.

3. The proofed frozen dough of claim 1, wherein the spent yeast component comprises yeast selected from cream yeast, compressed yeast, semi-dry yeast, frozen yeast, active dry yeast, instant yeast, or a combination thereof.

4. The proofed frozen dough of claim 3, wherein the yeast has been spent during proofing.

5. The proofed frozen dough of claim 1, wherein the spent yeast component has a yeast vitality of less than 25% of its initial vitality.

6. The proofed frozen dough of claim 1, wherein the preserved yeast component has a yeast vitality of at least 50% of its initial vitality.

7. The proofed frozen dough of claim 1, wherein the proofed frozen dough comprises about 0.1 to about 2 wt. % of the preserved yeast component.

8. The proofed frozen dough of claim 1, wherein the non-hydrated yeast comprises non-hydrated active dry yeast, non-hydrated instant yeast, non-hydrated semi-dry yeast, non-hydrated frozen yeast, or a combination thereof.

9. The proofed frozen dough of claim 1, wherein the proofed frozen dough has a volume, and wherein the gas bubbles make up about 30 to about 90% of the volume of the frozen dough.

10. The proofed frozen dough of claim 1, wherein the proofed frozen dough has a density of about 0.2 to about 0.5 $g/cm^3$.

11. The proofed frozen dough of claim 1, wherein the gas bubbles comprise gas produced by the spent yeast component during proofing.

12. The proofed frozen dough of claim 1, wherein the frozen dough is in its final shape and form for baking.

13. A method for making a frozen dough product, the method comprising:
    (a) mixing dough ingredients to produce a dough composition, the dough ingredients comprising:
        i. water;
        ii. flour;
        iii. a first yeast; and
        iv. a second yeast;
    (b) proofing the dough, wherein during proofing the first yeast is spent and the second yeast is preserved;
    (c) compressing the dough during or after proofing, and before freezing; and
    (d) freezing the dough after proofing
    wherein compressing the dough results in an increased final product volume after the frozen dough product is baked compared to an identical dough product made without a compressing step.

14. The method of claim 13, wherein at least 60% of the first yeast is spent during proofing.

15. The method of claim 13, wherein at least 50% of the second yeast is preserved during proofing.

16. The method of claim 13, wherein the dough ingredients comprise about 1 to about 7% of the first yeast.

17. The method of claim 13, wherein the dough ingredients comprise about 0.1 to about 2% of the second yeast.

18. The method of claim 13, wherein the second yeast is different from the first yeast.

19. The method of claim 13, wherein the second yeast comprises encapsulated yeast, fat coated yeast, non-hydrated active dry yeast, non-hydrated instant yeast, non-hydrated semi-dry yeast, non-hydrated frozen yeast, or a combination thereof.

20. The method of claim 13, wherein the mixing comprises mixing the water, flour, and first yeast for a first period of time, adding the second yeast and mixing the dough ingredients for a second period of time, wherein the first period of time is longer than the second period of time.

21. The method of claim 20, wherein the second period of time is from about 1 to about 2 minutes.

22. The method of claim 13 further comprising:
    shaping and cutting the dough to produce a pizza crust prior to proofing;
    freezing the pizza crust; and
    applying toppings to the frozen pizza crust.

23. The method of claim 13 further comprising refrigerating the dough after freezing.

24. The method of claim 23, wherein the dough is refrigerated for from about 12 hours to about 7 days.

25. A method for making a leavened bakery product, the method comprising:

(a) mixing dough ingredients to produce a dough, the dough ingredients comprising:
   i. water;
   ii. flour;
   iii. a first yeast; and
   iv. a second yeast;
(b) proofing the dough to produce a proofed dough, wherein the first yeast is spent during the proofing and the second yeast is preserved during the proofing;
(c) compressing the dough during or after proofing, and before freezing; and
(d) freezing the proofed dough; and
(e) baking the dough to produce the leavened bakery product
wherein compressing the dough increases the volume of the leavened bakery product after baking compared to an identical leavened bakery product made without a compressing step.

26. The method of claim 25, wherein the second yeast is different from the first yeast.

27. The method of claim 25, wherein the second yeast comprises encapsulated yeast, fat coated yeast, non-hydrated active dry yeast, non-hydrated instant yeast, non-hydrated semi-dry yeast, non-hydrated frozen yeast, or a combination thereof.

28. The method of claim 25, wherein the dough does not comprise chemical leaveners.

29. The method of claim 25, wherein the dough has a first volume before the proofing step, a second volume after the proofing step, and a third volume after the baking step, and wherein the third volume is at least 50% greater than the second volume.

30. The method of claim 29, wherein the third volume is greater than the second volume due at least in part to an activity of the second yeast during the baking step.

31. The method of claim 25, wherein the dough ingredients comprise about 20 to about wt. % water and about 50 to about 70 wt. % flour.

32. The method of claim 25, wherein the dough ingredients comprise about 1 to about 7 wt. % of the first yeast.

33. The method of claim 25, wherein the dough ingredients comprise about 0.1 to about 2 wt. % of the second yeast.

34. The method of claim 13, wherein the dough is compressed during proofing.

35. The method of claim 13, wherein the dough is compressed after proofing and before freezing.

36. The method of claim 13, wherein the dough is compressed for about 0.1 to about 2 second.

37. The method of claim 13, wherein the dough is compressed with a dough press at a pressure of about 200 to about 600 psi.

38. The method of claim 25, wherein the dough is compressed during proofing.

39. The method of claim 25, wherein the dough is compressed after proofing and before freezing.

40. The method of claim 25, wherein the dough is compressed for about 0.1 to about 2 second.

41. The method of claim 25, wherein the dough is compressed with a dough press at a pressure of about 200 to about 600 psi.

* * * * *